US012776863B2

(12) United States Patent
Elazzouni et al.

(10) Patent No.: US 12,776,863 B2
(45) Date of Patent: Oct. 27, 2026

(54) ARTIFICIAL INTELLIGENCE-ENABLED AUTOMATIC REPEAT REQUEST

(71) Applicant: QUALCOMM Incorporated, San Diego, CA (US)

(72) Inventors: Sherif Elazzouni, San Diego, CA (US); Gavin Bernard Horn, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 18/609,283

(22) Filed: Mar. 19, 2024

(65) Prior Publication Data

US 2025/0300768 A1 Sep. 25, 2025

(51) Int. Cl.
*H04L 1/18* (2023.01)
*H04L 1/1607* (2023.01)

(52) U.S. Cl.
CPC .............. *H04L 1/18* (2013.01); *H04L 1/1621* (2013.01)

(58) Field of Classification Search
CPC ................................ H04L 1/18; H04L 1/1621
See application file for complete search history.

(56) References Cited

U.S. PATENT DOCUMENTS

2023/0088550 A1* 3/2023 Wang .................... H04L 1/1822 370/329
2024/0323711 A1* 9/2024 Li .......................... H04B 17/17

FOREIGN PATENT DOCUMENTS

WO WO-2014025755 A1 2/2014
WO WO-2020159261 A1 8/2020

OTHER PUBLICATIONS

International Search Report and Written Opinion—PCT/US2025/020268—ISA/EPO—Jul. 1, 2025.

* cited by examiner

*Primary Examiner* — Erika A Washington
(74) *Attorney, Agent, or Firm* — Holland & Hart LLP

(57) ABSTRACT

Methods, systems, and devices for wireless communication are described. A wireless device may receive a configuration including a first set of one or more parameters for an automatic repeat request (ARQ) procedure associated with a radio link control (RLC) entity of the wireless device. At least one parameter of the first set of one or more parameters is associated with a plurality of values. The wireless device may select a value of the plurality of values for the ARQ procedure based on a second set of one or more parameters. The wireless device may receive at least one negative acknowledgment (NACK) for at least one protocol data unit (PDU) of a set of one or more PDUs, and perform one or more operations based on the at least one NACK and the selected value of the plurality of values for the ARQ procedure.

19 Claims, 18 Drawing Sheets

ARTIFICIAL INTELLIGENCE-ENABLED AUTOMATIC REPEAT REQUEST

FIELD OF TECHNOLOGY

The following relates to wireless communication, including artificial intelligence (AI)-enabled automatic repeat request (ARQ).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support artificial intelligence (AI)-enabled automatic repeat request (ARQ).

A method for wireless communications by a wireless device is described. The method may include receiving control signaling that indicates a configuration including a first set of one or more parameters for an ARQ procedure associated with a radio link control (RLC) entity of the wireless device, where at least one parameter of the first set of one or more parameters is associated with a set of multiple values, selecting a value of the set of multiple values for the ARQ procedure based on a second set of one or more parameters, receiving at least one negative acknowledgment (NACK) for at least one protocol data unit (PDU) of a set of one or more PDUs associated with the RLC entity of the wireless device, and performing one or more operations based on the at least one NACK for the at least one PDU and the selected value of the set of multiple values for the ARQ procedure, wherein the one or more operations includes a drop of the at least one PDU, a retransmission of the at least one PDU, or a declaration of an RLF.

A wireless device for wireless communications is described. The wireless device may include one or more memories storing processor executable code, and one or more processors coupled with the one or more memories. The one or more processors may individually or collectively be operable to execute the code to cause the wireless device to receive control signaling that indicates a configuration including a first set of one or more parameters for an ARQ procedure associated with a RLC entity of the wireless device, where at least one parameter of the first set of one or more parameters is associated with a set of multiple values, select a value of the set of multiple values for the ARQ procedure based on a second set of one or more parameters, receive at least one NACK for at least one PDU of a set of one or more PDUs associated with the RLC entity of the wireless device, and perform one or more operations based on the at least one NACK for the at least one PDU and the selected value of the set of multiple values for the ARQ procedure, wherein the one or more operations includes a drop of the at least one PDU, a retransmission of the at least one PDU, or a declaration of a radio link failure (RLF).

Another wireless device for wireless communications is described. The wireless device may include means for receiving control signaling that indicates a configuration including a first set of one or more parameters for an ARQ procedure associated with a RLC entity of the wireless device, where at least one parameter of the first set of one or more parameters is associated with a set of multiple values, means for selecting a value of the set of multiple values for the ARQ procedure based on a second set of one or more parameters, means for receiving at least one NACK for at least one PDU of a set of one or more PDUs associated with the RLC entity of the wireless device, and means for performing one or more operations based on the at least one NACK for the at least one PDU and the selected value of the set of multiple values for the ARQ procedure, wherein the one or more operations includes a drop of the at least one PDU, a retransmission of the at least one PDU, or a declaration of an RLF.

A non-transitory computer-readable medium storing code for wireless communications is described. The code may include instructions executable by one or more processors to receive control signaling that indicates a configuration including a first set of one or more parameters for an ARQ procedure associated with a RLC entity of a wireless device, where at least one parameter of the first set of one or more parameters is associated with a set of multiple values, select a value of the set of multiple values for the ARQ procedure based on a second set of one or more parameters, receive at least one NACK for at least one PDU of a set of one or more PDUs associated with the RLC entity of the wireless device, and perform one or more operations based on the at least one NACK for the at least one PDU and the selected value of the set of multiple values for the ARQ procedure, wherein the one or more operations includes a drop of the at least one PDU, a retransmission of the at least one PDU, or a declaration of an RLF.

Some examples of the method, wireless devices, and non-transitory computer-readable medium described herein may further include operations, features, means, or instructions for transmitting, via the RLC entity of the wireless device, an indication to a second RLC entity of a second wireless device for updating a reception window associated with the set of one or more PDUs and where the one or more operations may be performed further based on the indication.

Some examples of the method, wireless devices, and non-transitory computer-readable medium described herein may further include operations, features, means, or instructions for generating a control PDU including a set of one or more fields, where at least one field of the set of one or more fields includes the indication, where updating the reception window corresponds to moving the reception window according to at least one sequence number, transmitting, to the second wireless device, the control PDU, and updating a sequence number associated with at least one second PDU based on the indication, where the sequence number corresponds to the at least one sequence number.

In some examples of the method, wireless devices, and non-transitory computer-readable medium described herein, the indication serves as a trigger to update a third set of one or more parameters associated with the second RLC entity of the second wireless device and the third set of one or more parameters includes a sequence number parameter associated with the set of one or more PDUs, a reassembly parameter associated with the set of one or more PDUs, or a status parameter associated with the set of one or more PDUs.

In some examples of the method, wireless devices, and non-transitory computer-readable medium described herein, the first set of one or more parameters includes an input to a learning model for the ARQ procedure, the second set of one or more parameters includes an output of the learning model for the ARQ procedure, and selecting the value of the set of multiple values for the ARQ procedure may be based on the input to the learning model and the output of the learning model.

Some examples of the method, wireless devices, and non-transitory computer-readable medium described herein may further include operations, features, means, or instructions for receiving, from a second wireless device, control signaling including a configuration that indicates a third set of one or more parameters, where the configuration includes a radio resource control (RRC) configuration, and where the third set of one or more parameters includes at least one performance metric for the ARQ procedure, and applying the third set of one or more parameters to the learning model for ARQ procedure.

Some examples of the method, wireless devices, and non-transitory computer-readable medium described herein may further include operations, features, means, or instructions for obtaining the output from the learning model based on one or more of the first set of one or more parameters or the third set of one or more parameters and on a mapping of one or more of the first set of one or more parameters or the third set of one or more parameters to the second set of one or more parameters, where the output indicates at least one parameter of the second set of one or more parameters, where the at least one parameter corresponds to at least one of the one or more operations.

In some examples of the method, wireless devices, and non-transitory computer-readable medium described herein, the output from the learning model is based at least in part on a fourth set of one or more parameters, wherein the fourth set of one or more parameters is based at least in part on one or more of the first set of one or more parameters or the third set of one or more parameters, and wherein at least one parameter of the fourth set of one or more parameters indicates: a first threshold quantity of retransmissions for the at least one PDU, wherein the first threshold quantity of retransmissions is to be satisfied before the at least one PDU is dropped, a transmission window associated with the set of one or more PDUs and for detection of the RLF, the transmission window corresponding to a set of one more sequence numbers associated with the set of one or more PDUs, a second threshold quantity of retransmissions or drops for the set of one or more PDUs, wherein the second threshold quantity of retransmissions or drops is to be satisfied during the transmission window before the RLF is declared, a third threshold quantity of retransmissions for the at least one PDU, wherein the third threshold quantity of retransmissions for the at least one protocol data unit is to be satisfied before the RLF is declared, a reference signal received power (RSRP) threshold value that serves as a trigger to enable one or more of the first threshold quantity of retransmissions or the third threshold quantity of retransmissions, or an activation or deactivation of the learning model.

Some examples of the method, wireless devices, and non-transitory computer-readable medium described herein may further include operations, features, means, or instructions for updating at least one parameter of the fourth set of one or more parameters based on a periodicity and transmitting, to a second wireless device, an indication of the at least one parameter of the fourth set of one or more parameters.

In some examples of the method, wireless devices, and non-transitory computer-readable medium described herein, the mapping includes an association between one or more of the first set of one or more parameters or the third set of one or more parameters to the second set of one or more parameters according to a data traffic flow associated with the at least one PDU, a logical channel associated with the at least one PDU, or a component carrier associated with the at least one PDU.

Some examples of the method, wireless devices, and non-transitory computer-readable medium described herein may further include operations, features, means, or instructions for generating a report associated with the learning model, where the report includes a set of one or more logs associated with processing of one or more PDUs of the set of one or more PDUs according to the learning model and transmitting, to a second wireless device, the report associated with the learning model.

In some examples of the method, wireless devices, and non-transitory computer-readable medium described herein, a first threshold quantity of retransmissions for the at least one PDU, wherein the first threshold quantity of retransmissions is to be satisfied before the at least one PDU is dropped, a transmission window associated with the set of one or more PDUs and for detection of the RLF, the transmission window corresponding to a set of one more sequence numbers associated with the set of one or more PDUs, a second threshold quantity of retransmissions or drops for the set of one or more PDUs, wherein the second threshold quantity of retransmissions or drops is to be satisfied during the transmission window before the RLF is declared, a third threshold quantity of retransmissions for the at least one PDU, wherein the third threshold quantity of retransmissions for the at least one protocol data unit is to be satisfied before the RLF is declared, and a RSRP threshold value that serves as a trigger to enable one or more of the first threshold quantity of retransmissions or the third threshold quantity of retransmissions.

In some examples of the method, wireless devices, and non-transitory computer-readable medium described herein, at least one log of the set of one or more logs indicates one or more of a quantity of retransmissions associated with the set of one or more PDUs, a quantity of drops associated with the set of one or more PDUs, or a quantity of RLFs associated with the set of one or more PDUs.

In some examples of the method, wireless devices, and non-transitory computer-readable medium described herein, at least one log of the set of one or more logs includes an indication that the RLC entity of the wireless device satisfies at least one parameter of a third set of one or more parameters for a packet delay budget, the at least one parameter includes a threshold quantity of successful transmissions of the set of one or more PDUs, and the indication includes a percentage corresponding to successful transmissions of the set of one or more PDUs within the packet delay budget.

Some examples of the method, wireless devices, and non-transitory computer-readable medium described herein may further include operations, features, means, or instructions for determining a performance metric associated with the learning model based on processing the set of one or more PDUs according to the learning model and where the performance metric may indicate a difference between an expected quantity of PDU transmissions of the set of one or more PDUs and an actual quantity of PDU transmissions of the set of one or more PDUs.

Some examples of the method, wireless devices, and non-transitory computer-readable medium described herein may further include operations, features, means, or instructions for transmitting, to a second wireless device, a report including capability information that indicates whether the wireless device supports the learning model, the capability information including one or more of at least one bit field, and where the capability information may be based on a performance metric associated with the learning model and where the control signaling that indicates the configuration may be received based on the capability information that indicates whether the wireless device supports the learning model.

Some examples of the method, wireless devices, and non-transitory computer-readable medium described herein may further include operations, features, means, or instructions for determining at least two states associated with the RLC entity of the wireless device, where, a first state of the at least two states corresponds to a set of one or more conditions associated with processing the set of one or more PDUs irrespective of the learning model, a second state of the at least two states corresponds to processing the set of one or more PDUs according to the learning model, the configuration includes an indication of the set of one or more conditions associated with processing the set of one or more PDUs irrespective of the learning model, and the set of one or more conditions includes a first condition to be satisfied before the RLF is declared, a second condition to be satisfied before the retransmission of the at least one PDU, or a third condition to be satisfied before the at least one PDU is dropped.

In some examples of the method, wireless devices, and non-transitory computer-readable medium described herein, receiving the at least one NACK for at least one PDU may include operations, features, means, or instructions for obtaining, via the RLC entity of the wireless device, a status report including the at least one NACK for the at least one PDU, where the at least one PDU includes a header that indicates a sequence number associated with the at least one PDU, and where the status report may be based on the sequence number associated with the at least one PDU, and where the first set of one or more parameters includes one or more of at least one radio link condition, at least one hybrid ARQ (HARQ) process, at least one status of the RLC entity of the wireless device, at least one status of a packet data convergence protocol (PDCP) entity of the wireless device, at least one quality level of at least one parameter of a third set of one or more parameters satisfying a threshold, at least one status of a transmission control protocol (TCP), or at least on criterion of an application or service associated with the wireless device

DETAILED DESCRIPTION

Figure 1:
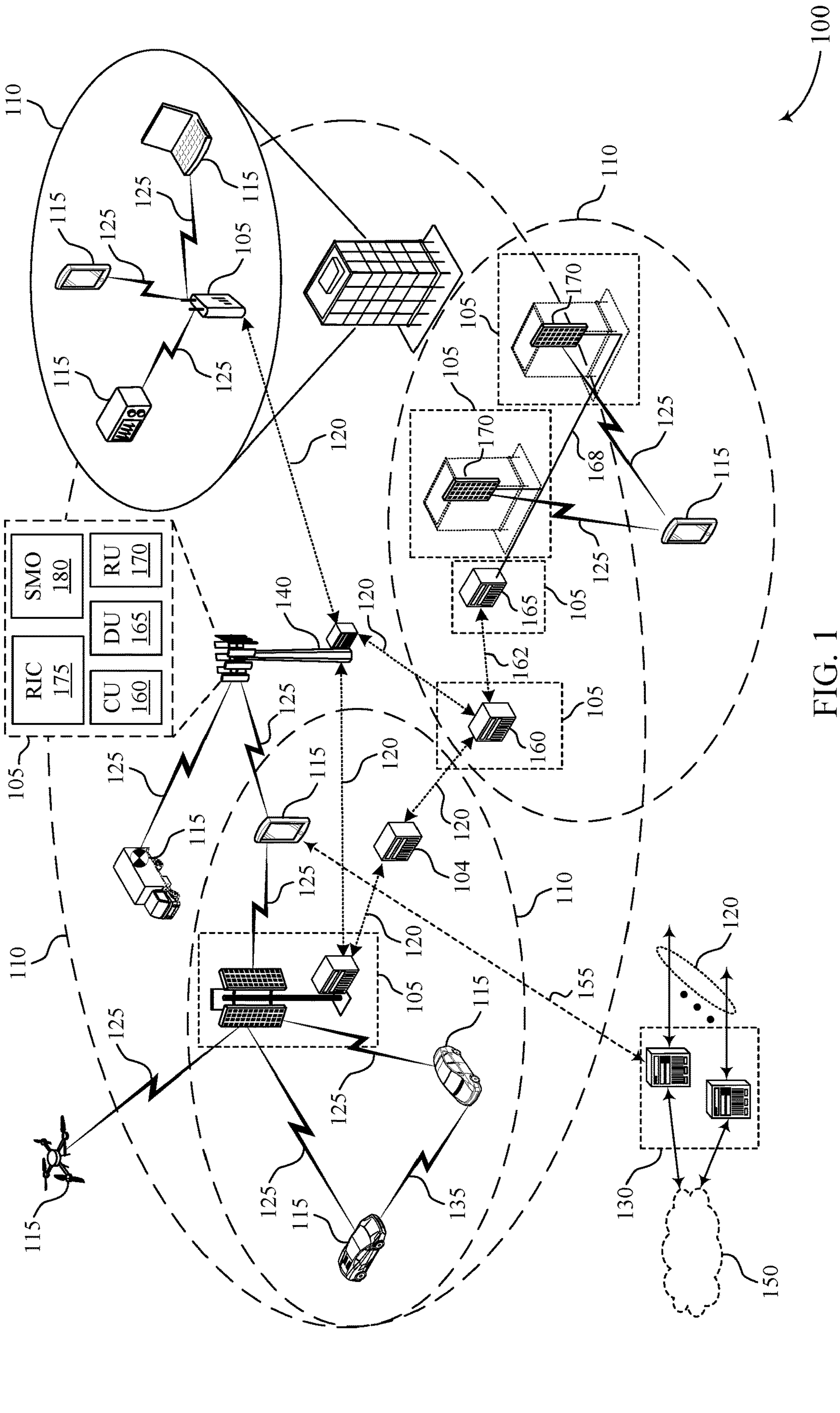
FIG. 1 shows an example of a wireless communications system that supports AI-enabled ARQ in accordance with one or more aspects of the present disclosure.

A wireless device may be equipped with a protocol stack to support various functionalities associated with wireless communication. The protocol stack may include various protocol layers. One example of a protocol layer includes a radio link control (RLC) layer (also referred to as an RLC entity herein). The RLC layer may perform transfer of upper layer protocol data unit (PDUs) according to one or more modes, including: an acknowledged mode (AM), an unacknowledged mode (UM), and a transparent mode (TM). The RLC layer may receive an RLC service data unit (SDU) from and/or transmit to upper protocol layers of the protocol stack of the wireless device. The RLC layer may perform error correction through ARQ, concatenation, segmentation, and reassembly of RLC SDUs, re-segmentation of RLC data PDUs, reordering of RLC data PDUs, duplicate detection, RLC re-establishment and protocol error detection and recovery.

The RLC layer may be referred to as a TM RLC entity, an UM RLC entity, or an AM RLC entity based on a configured mode of data transfer for the RLC entity. In some cases, an UM RLC entity may experience excessive losses of RLC SDUs, particularly when relying solely on HARQ. In some other cases, an AM RLC entity may experience increased latency due to retransmission, resegmentation, reordering delay, etc., associated with RLC SDUs and/or RLC data PDUs. In some cases, this may cause the AM RLC entity to declare RLFs due to meeting certain thresholds or buffer limitations at the AM RLC entity.

Various aspects of the present disclosure relate to enabling the wireless device (e.g., including an RLC layer of the wireless device) to support processing of PDUs (RLC SDUs and/or RLC data PDUs) according to a learning model (e.g., an artificial intelligence (AI)/machine learning (ML) model). The learning model may improve efficient processing (e.g., discarding, retransmitting, decoding) of PDUs (RLC SDUs and/or RLC data PDUs). In some examples, the learning model may enable the wireless device to support efficient monitoring of congestion levels and adjust parameters dynamically for processing (e.g., discarding, retransmitting, decoding) of RLC SDUs and/or RLC data PDUs. The learning model may enable the wireless device (e.g., including an RLC layer of the wireless device) to identify specific quality of service (QOS) requirements and adjust parameters dynamically for processing (e.g., discarding, retransmitting, decoding) of PDUs (RLC SDUs and/or RLC data PDUs). Additionally, the wireless device may be configured with one or more parameters and constraints for the learning model. The wireless device may maintain and report logs for tracking the performance of the learning model, specifically related to processing of PDUs (RLC SDUs and/or RLC data PDUs).

By enabling the wireless device to support processing of PDUs (RLC SDUs and/or RLC data PDUs) according to a learning model (e.g., an AI/ML model), the wireless device may experience reduced latency due to early termination of retransmission of PDUs (RLC SDUs and/or RLC data PDUs), among other examples. It should be understood that other models or data structures (e.g., tables) may be used for supporting and enabling the wireless device (e.g., an RLC layer of the wireless device) to support processing of PDUs (RLC SDUs and/or RLC data PDUs) as described herein.

Aspects of the disclosure are initially described in the context of wireless communications systems. Aspects of the disclosure are further illustrated by and described with reference to apparatus diagrams, system diagrams, and flowcharts that relate to AI-enabled ARQ.

FIG. 1 shows an example of a wireless communications system 100 that supports AI-enabled ARQ in accordance with one or more aspects of the present disclosure. The wireless communications system 100 may include one or more devices, such as one or more network devices (e.g., network entities 105), one or more UEs 115, and a core network 130. In some examples, the wireless communications system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), packet data convergence protocol (PDCP)). The CU 160 (e.g., one or more CUs) may be connected to a DU 165 (e.g., one or more DUs) or an RU 170 (e.g., one or more RUs), or some combination thereof, and the DUs 165, RUS 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., ARQ). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Figure 2:
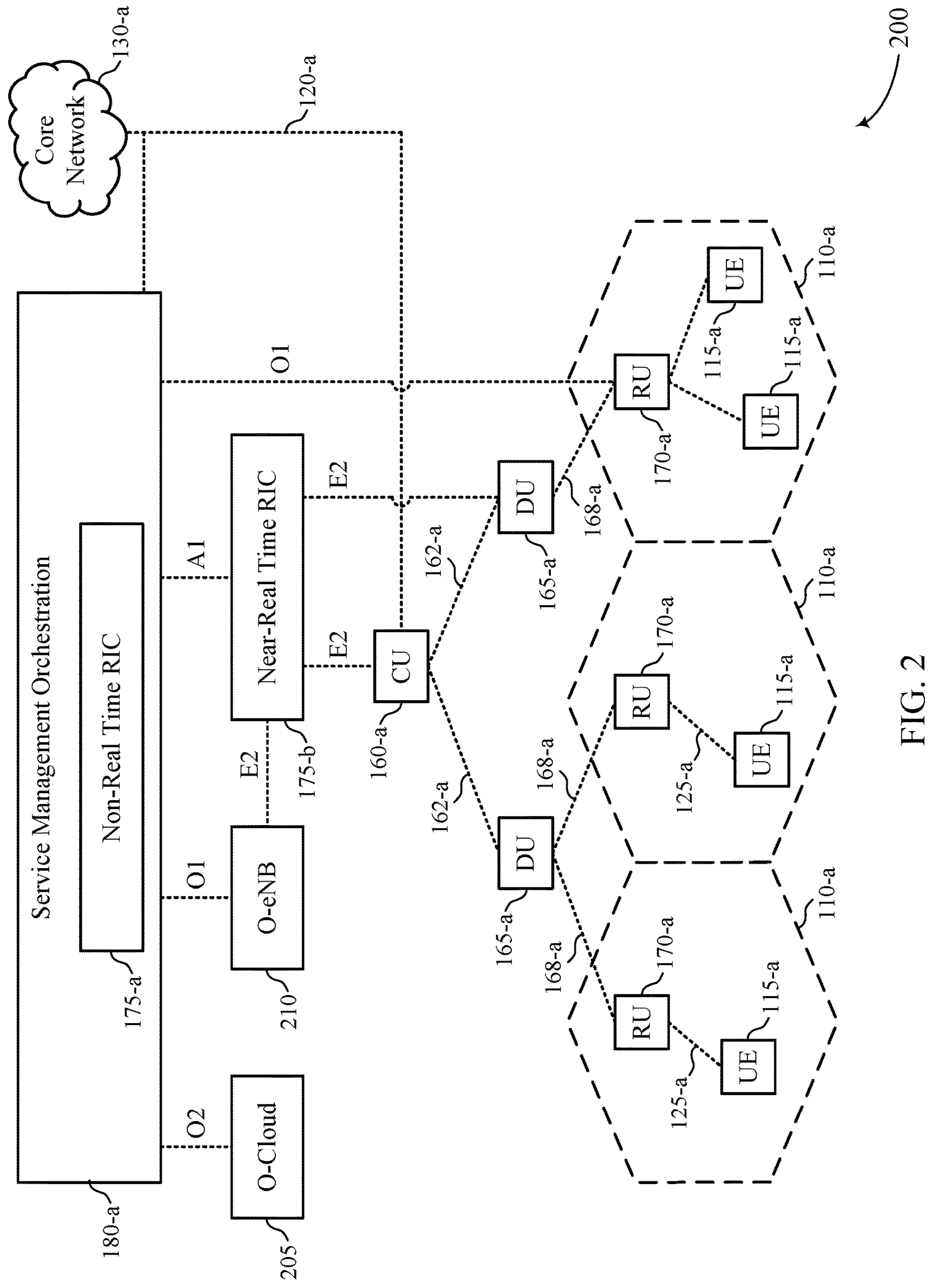
FIG. 2 shows an example of a network architecture that supports AI-enabled ARQ in accordance with one or more aspects of the present disclosure.

FIG. 2 shows an example of a network architecture 200 (e.g., a disaggregated base station architecture, a disaggregated RAN architecture) that supports AI-enabled ARQ in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an AI interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
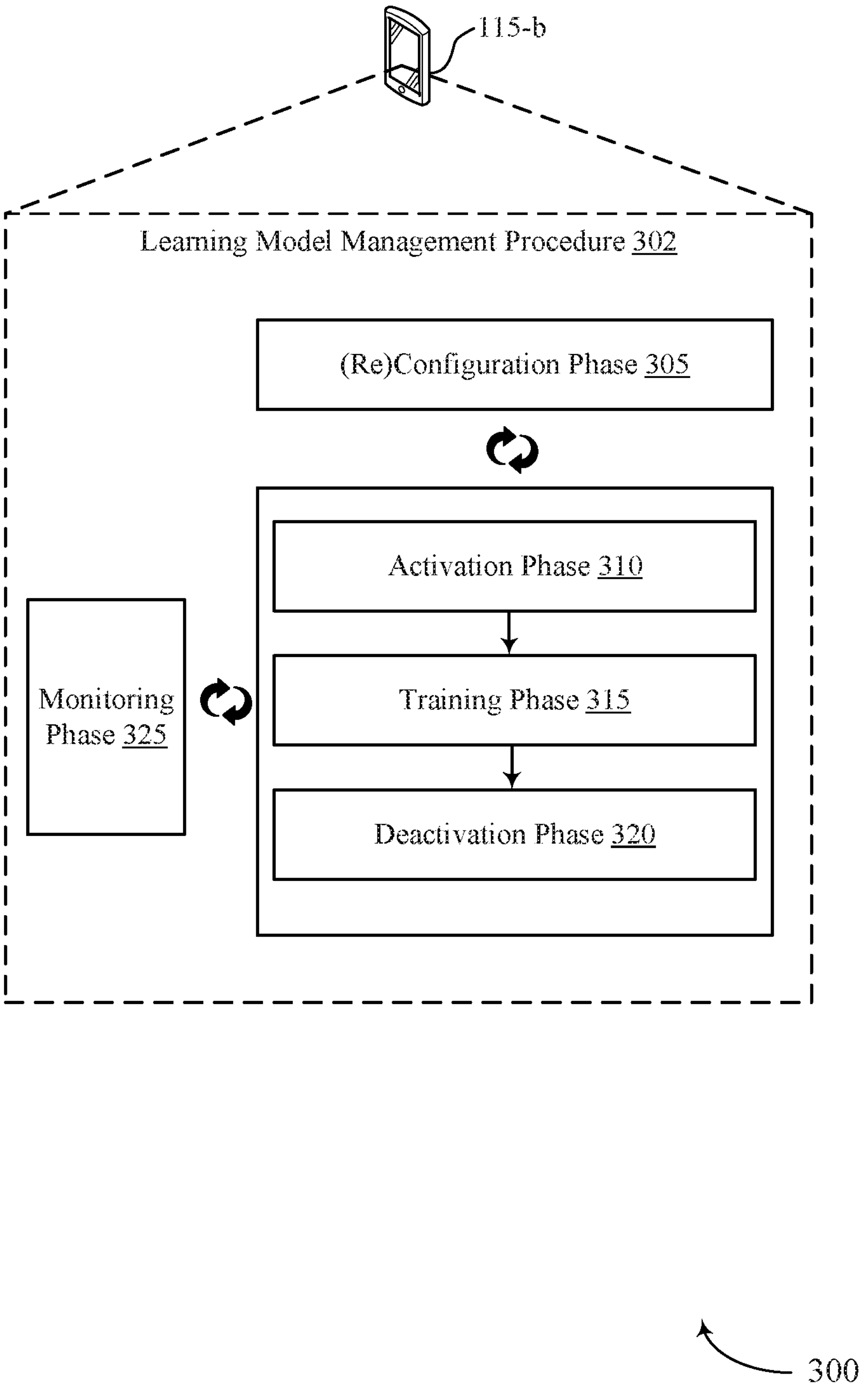
FIG. 3 shows a block diagram of a UE that supports AI-enabled ARQ in accordance with one or more aspects of the present disclosure.

FIG. 3 shows a block diagram 300 of a UE 115-*b* that supports AI-enabled ARQ in accordance with one or more aspects of the present disclosure. The UE 115-*b* may be an example of aspects of a UE 115 as described herein with reference to FIGS. 1 and 2, respectively. The UE 115-*b* may implement aspects of the wireless communications system 100 as described with reference to FIG. 1. Additionally, or alternatively, the UE 115-*b* may implement or be implemented by aspects of the network architecture 200 as described herein with reference to FIG. 2.

In the example of FIG. 3, the UE 115-*b* may support a learning model management procedure 302 associated with one or more learning models for AI-enabled ARQ. The learning model management procedure 302 may include one or more of a (re) configuration phase 305, an activation phase 310, a training phase 315 (also referred to as an inference phase), a deactivation phase 320, or a monitoring phase 325. The one or more learning models for AI-enabled ARQ may be locally stored (e.g., one or more memories storing processor-executable code of the at least one learning model AI-enabled ARQ) at the UE 115-*b*. Alternatively, the UE 115-*b* may obtain (e.g., download) the one or more learning models for AI-enabled ARQ, for example, via a network entity 105 or a base station 140, which may be examples of network entities 105 or base stations 140 as described herein with reference to FIGS. 1 and 2, respectively.

One or more operations of the learning model management procedure 302 may be implemented by the UE 115-*b* or components (e.g., one or more memories storing processor-executable code, one or more processors coupled with the one or more memories and individually or collectively operable to execute the code to cause the UE 115-*b* to perform the operations associated with AI-enabled ARQ) as described herein. In the following description of the learning model management procedure 302, the one or more operations performed by the UE 115-*b* may be performed in different orders or at different times. Some operations may also be omitted from the learning model management procedure 302, and other operations may be added to the learning model management procedure 302.

During the (re) configuration phase 305, the UE 115-*b* may receive, from a network entity 105 or a base station 140, a set of one or more configurations including a set of one or more parameters for configuring or reconfiguring one or more learning models (e.g., AI/ML models) for AI-enabled ARQ. The UE 115-*b* may receive, from a network entity 105 or a base station 140, a request message for configuring or reconfiguring the one or more learning models for AI-enabled ARQ. The request may include the set of one or more configurations and one or more identifiers associated with one or more learning models for AI-enabled ARQ. The UE 115-*b* may transmit, to the network entity 105 or the base station 140, a response message that includes an acknowledgement of the request message.

In some examples, the set of one or more parameters may be for managing (e.g., training, updating, modifying) the one or more learning models. In some other examples, the set of one or more parameters may be an input for the one or more learning models, for example, for inference of the one or more learning models. In other examples, the set of one or more parameters may be for monitoring one or more performance metrics (also referred to as key performance indicators (KPIs)) for the one or more learning models. Additionally, or alternatively, the set of one or more configurations may include one or more RRC configurations (e.g., one or more measurement configurations, one or more MAC configurations, or the like).

During the activation phase 310, the UE 115-*b* may activate at least one learning model for AI-enabled ARQ (e.g., for at least one action associated with AI-enabled ARQ). During the training phase 315, the UE 115-*b* may train the at least one learning model for AI-enabled ARQ to obtain a set of one or more outputs based at least in part on a set of one or more inputs (e.g., a set of one or more parameters). During the deactivation phase 320, the UE 115-*b* may deactivate the at least one learning model (e.g., for at least one action associated with AI-enabled ARQ).

During the monitoring phase 325, the UE 115-*b* may monitor (e.g., track) a performance of the at least one learning model. One or more of a network entity 105, a base station 140, or the UE 115-*b* may share (e.g., transmit, receive, exchange) feedback associated with the performance of the at least one learning model for AI-enabled ARQ. The performance may be associated with a system performance (e.g., spectral efficiency, power consumption, delay, etc.) or a model performance (e.g., prediction accuracy, resource usage, inference delay, etc.). In some examples, one or more of a network entity 105, a base station 140, or the UE 115-*b* may trigger a switching event that includes switching (e.g., changing) from at least one learning model to at least one different learning model, for example, based at least in part on feedback associated with a performance of the at least one learning model. In some other examples, one or more of a network entity 105, a base station 140, or the UE 115-*b* may update the training of the at least one learning model for AI-enabled ARQ based at least in part on the feedback associated with the performance of the at least one learning model.

The UE 115-*b* may switch from at least one learning model to at least one different learning model based at least in part on a function supported by the different learning model (e.g., an action associated with AI-enabled ARQ). In some examples, the UE 115-*b* may receive, from a network entity 105 or a base station 140, a request message to switch to the at least one different learning model. The request message may indicate an identifier associated with the at least one different learning model for AI-enabled ARQ, and the UE 115-*b* may identify the least one different learning model based at least in part on the identifier. During the activation phase 310 of the learning model management procedure 302, the UE 115-*b* may activate the at least one different learning model (e.g., a different AI/ML model) for AI-enabled ARQ. Additionally, during the deactivation phase 320, the UE 115-*b* may deactivate the at least one learning model (e.g., a current AI/ML model).

Additionally, or alternatively, during the monitoring phase 325, the UE 115-*b* may trigger the switching event based at least in part on a change in one or more parameters of the UE 115-*b* (e.g., a number of antennas, a number of carriers, etc.). In some examples, the UE 115-*b* may trigger the switching event based at least in part on a change in a location of the UE 115-*b* (e.g., a change from an indoor environment to an outdoor environment, or vice-versa). In some other examples, the UE 115-*b* may trigger the switching event based at least in part on a change in a service (e.g., network slice, QoS flow, session, etc.).

Accordingly, the UE 115-*b* may be configured to support managing (e.g., configuring, reconfiguring, activating, deactivating, monitoring, reporting, etc.) of one or more leaning models for AI-enabled ARQ.

Figure 4:
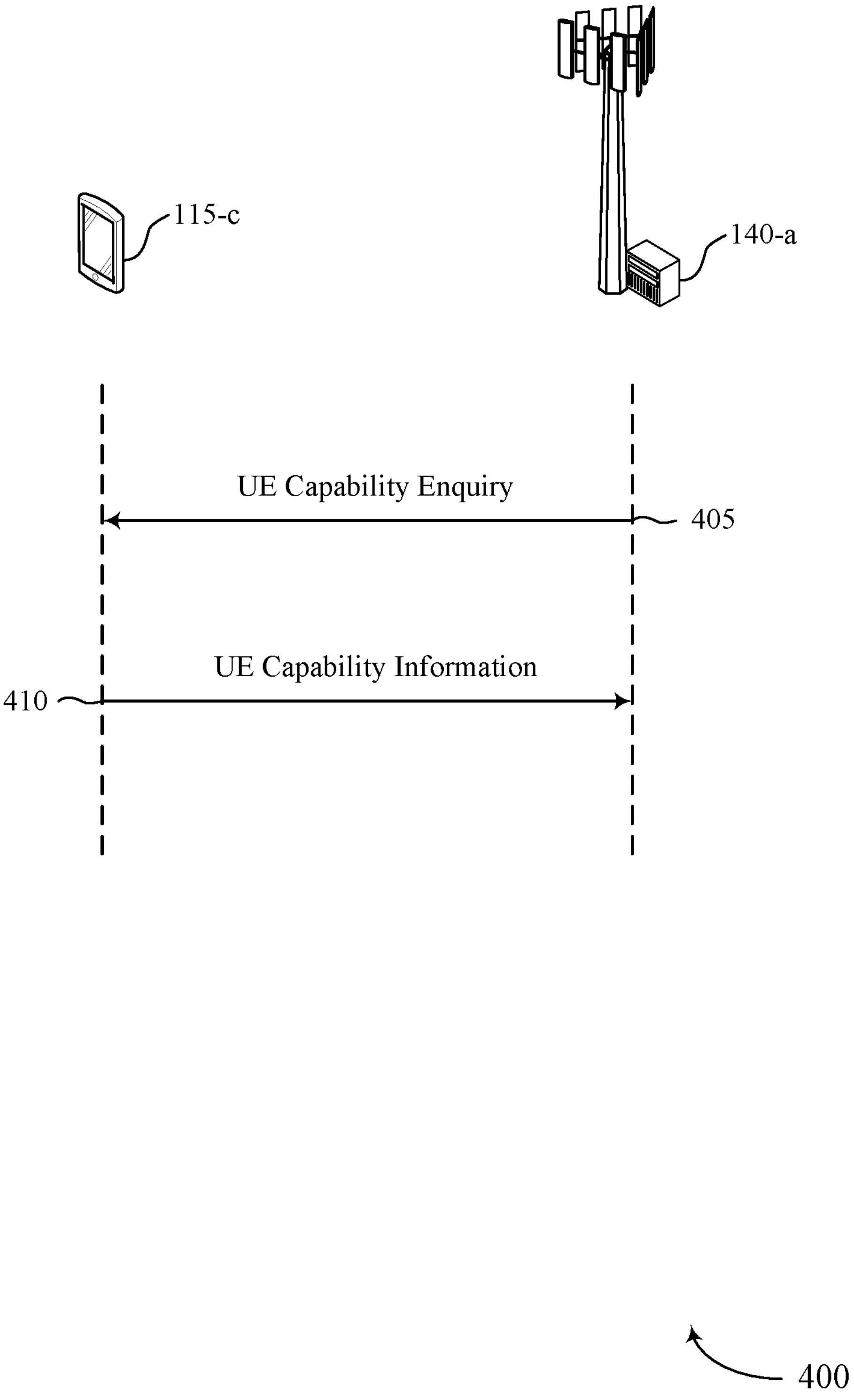
FIGS. 4 through 10 show examples of process flows that support AI-enabled ARQ in accordance with one or more aspects of the present disclosure.

FIG. 4 shows an example of a process flow 400 that supports AI-enabled ARQ in accordance with one or more aspects of the present disclosure. The process flow 400 may implement aspects of the wireless communications system 100 as described with reference to FIG. 1. Additionally, or alternatively, the process flow 400 may implement or be implemented by aspects of the network architecture 200 as described herein with reference to FIG. 2. The process flow 400 may include a UE 115-*c* and a base station 140-*a*, which may be examples of UEs 115 and base stations 140 as described herein. In the following description of the process flow 400, the operations between the UE 115-*c* and the base station 140-*a* may be transmitted in a different order than the example order shown, or the operations performed by the UE 115-*c* and the base station 140-*a* may be performed in different orders or at different times. Some operations may also be omitted from the process flow 400, and other operations may be added to the process flow 400.

In the example of FIG. 4, the UE 115-*c* may support providing an indication to the base station 140-*a* of one or more learning models for AI-enabled ARQ, including one or more features for AI-enabled ARQ, supported by the UE 115-*c*. At 405, the base station 140-*a* may transmit, and the UE 115-*c* may receive, a request message (e.g., a UE capability enquiry). The UE 115-*c* may determine, in response to the UE capability enquiry, a set of one or more UE capabilities for AI-enabled ARQ. For example, the UE 115-*c* may determine whether the UE 115-*c* supports AI/ML functionality, including one or more learning models (e.g., AI/ML models) or one or more features associated with the one or more learning models for AI-enabled ARQ.

At 410, the UE 115-*c* may transmit, and the base station 140-*a* may receive, a response messages (e.g., UE capability information), in response to the request message. The UE capability information may include a set of one or more features supported by the UE 115-*c* for AI-enabled ARQ. In some examples, the UE capability information may include a set of one or more identifiers associated with the one or more learning models for AI-enabled ARQ, supported by the UE 115-*c*. Additionally, or alternatively, the UE capability information may include at least one field (e.g., information element (IE), flag, or the like) that indicates whether a corresponding learning model is loaded (e.g., initialized, stored, cached, or the like) at the UE 115-*c*. Additionally, or alternatively, the UE capability information may include a set of one or more identifiers associated with one or more learning model structures for AI-enabled ARQ, or a set of one or more parameters for one or more features associated with the one or more learning model structures for AI-enabled ARQ.

Accordingly, the UE 115-*c* may be configured to support exchange of UE capability information associated with one or more learning models for AI-enabled ARQ.

Figure 5:
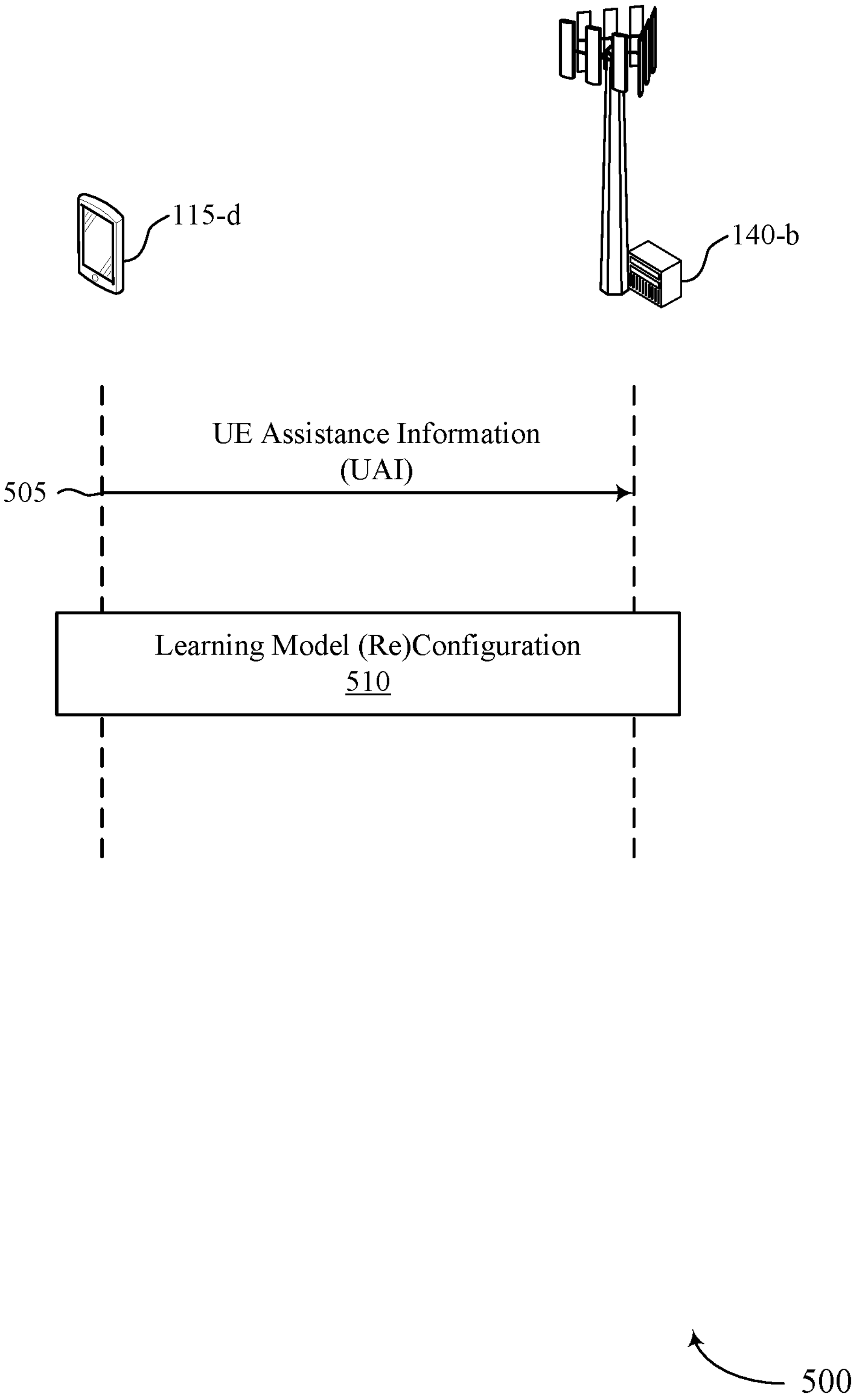

FIG. 5 shows an example of a process flow 500 that supports AI-enabled ARQ in accordance with one or more aspects of the present disclosure. The process flow 500 may implement aspects of the wireless communications system 100 as described with reference to FIG. 1. Additionally, or alternatively, the process flow 500 may implement or be implemented by aspects of the network architecture 200 as described herein with reference to FIG. 2. The process flow 500 may include a UE 115-*d* and a base station 140-*b*, which may be examples of UEs 115 and base stations 140 as described herein. In the following description of the process flow 500, the operations between the UE 115-*d* and the base station 140-*b* may be transmitted in a different order than the example order shown, or the operations performed by the UE 115-*d* and the base station 140-*b* may be performed in different orders or at different times. Some operations may also be omitted from the process flow 500, and other operations may be added to the process flow 500.

In the example of FIG. 5, the UE 115-*d* may support providing UE assistance information (UAI) to the base station 140-*b*. More specifically, the UE 115-*d* may support transmitting, to the base station 140-*b*, UAI for managing one or more learning models for AI-enabled ARQ. At 505, the UE 115-*d* may transmit, and the base station 140-*b* may receive, UAI that may indicate one or more restrictions (also referred to as restricted UE capabilities) associated with the one or more learning models for AI-enabled ARQ. For example, the restricted UE capabilities may include a set of one or more learning models, a set of one or more identifiers associated with the set of one or more learning models, or both. In some examples, the restricted UE capabilities may exclude the set of one or more identifiers. In some examples, the UE 115-*d* may indicate a request to adjust (e.g., reduce, decrease, increase) a concurrency of the one or more learning models. For example, the UE 115-*d* may indicate a threshold number of concurrency (e.g., "maxAIMLconcurrency-Preference") associated with the one or more learning models for AI-enabled ARQ.

The UE 115-*d* may generate and transmit the UAI to the base station 140-*b* based at least in part on a condition (e.g., an event). One or more examples of a condition may include, but is not limited to, a battery level of the UE 115-*d* satisfying a battery level threshold, a processor usage level of one or more processors of the UE 115-*d* satisfying a processor usage level threshold, or a heat level of one or more processors of the UE 115-*d* satisfying a heat level threshold. For example, the UE 115-*d* may transmit the UAI to the base station 140-*b* to manage (e.g., deactivate, activate) one or more learning models for AI-enabled ARQ at the UE 115-*d* based at least in part on one or more of the battery level of the UE 115-*d* satisfying the battery level threshold, the processor usage level of the one or more processors of the UE 115-*d* satisfying the processor usage level threshold, or the heat level of the one or more processors of the UE 115-*d* satisfying the heat level threshold.

Additionally, or alternatively, in some examples, the UAI may include a request for a set of one or more configurations associated with one or more learning models for AI-enabled ARQ. In some examples, the UE 115-*d* may request the base station 140-*b* for the set of one or more configurations associated with the one or more learning models for AI-enabled ARQ based at least in part on a change in an environment of the UE 115-*d*. In some other examples, the UE 115-*d* may request the base station 140-*b* for the set of one or more configurations associated with the one or more learning models for AI-enabled ARQ based at least in part on a change in a state of the UE 115-*d* (e.g., a change between one or more of an idle state, an inactive state, or a connected state).

In other examples, the UE 115-*d* may request the base station 140-*b* for the set of one or more configurations associated with the one or more learning models for AI-enabled ARQ based at least in part on a session establishment associated with a network slice. For example, the UE 115-*d* may establish a session (e.g., a PDU session) associated with the network slice, and request the base station 140-*b* for the set of one or more configurations associated with the one or more learning models for AI-enabled ARQ. In some other examples, the UE 115-*d* may request the base station 140-*b* for the set of one or more configurations associated with the one or more learning models for AI-enabled ARQ based at least in part on a change in a geographic coverage area of the UE 115-*d*. For example, the UE 115-*d* may enter a new geographic coverage area of a cell, public land mobile network (PLMN), and request the base station 140-*b* for the set of one or more configurations associated with the one or more learning models for AI-enabled ARQ.

At least one configuration of the set of one or more configurations associated with provisioning of network data as input for one or more learning models (e.g., AI/ML models). In some examples, the at least one configuration may indicate at least one identifier associated with at least one learning model supporting the network data as input to the least one learning model. In some examples, the UE 115-*d* may request (e.g., on-demand) for the network data from the base station 140-*b* via the UAI, for example, based at least in part on the set of one or more configurations associated with provisioning of network data as input for one or more learning models (e.g., AI/ML models).

At 510, one or more of the UE 115-*d* or the base station 140-*b* may configure or reconfigure at least one learning model for AI-enabled ARQ. For example, the base station 140-*b* may select at least one learning model for AI-enabled ARQ to deactivate at the UE 115-*d*, based at least in part on the UAI, and transmit control signaling (e.g., RRC, MAC-CE, DCI) for deactivating the at least one learning model for AI-enabled ARQ. For example, the base station 140-*b* may determine and select which learning model to deactivate at the UE 115-*d* based at least in part on the UAI, and transmit the control signaling (e.g., RRC, MAC-CE, DCI) that indicates for the UE 115-*d* to deactivate the at least one learning model for AI-enabled ARQ. Additionally, or alternatively, the base station 140-*b* may determine and select which learning model to configure or reconfigure and activate at the UE 115-*d* based at least in part on the UAI. For example, the base station 140-*b* may determine and select which learning model to activate at the UE 115-*d* based at least in part on the UAI, and transmit control signaling (e.g., RRC, MAC-CE, DCI) that indicates for the UE 115-*d* to activate the at least one learning model for AI-enabled ARQ.

Accordingly, the UE 115-*d* may be configured to support exchange of UAI for managing AI-enabled ARQ.

Figure 6:
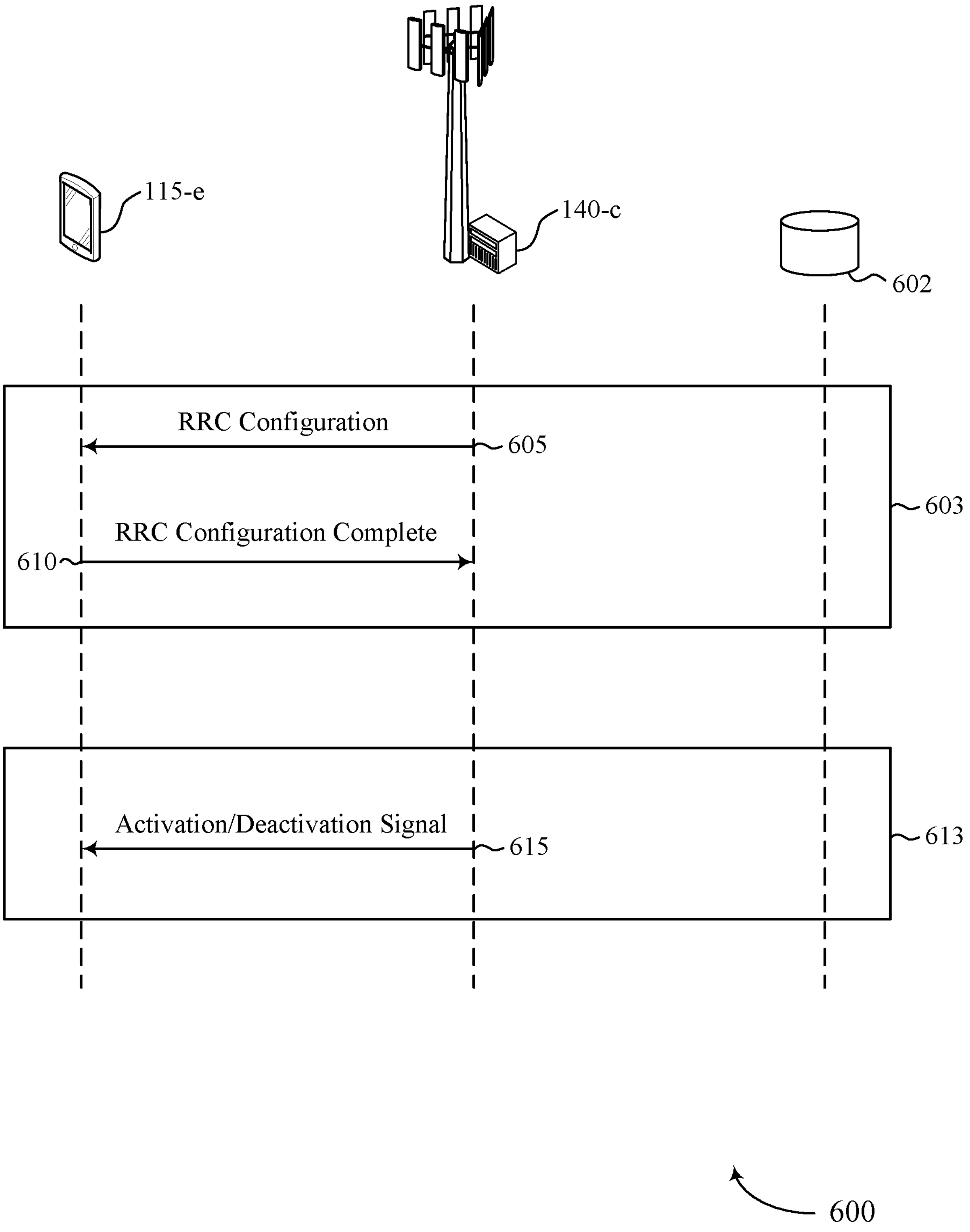

FIG. 6 shows an example of a process flow 600 that supports AI-enabled ARQ in accordance with one or more aspects of the present disclosure. The process flow 600 may implement aspects of the wireless communications system 100 as described with reference to FIG. 1. Additionally, or alternatively, the process flow 600 may implement or be implemented by aspects of the network architecture 200 as described herein with reference to FIG. 2. The process flow 600 may include a UE 115-*e* and a base station 140-*c*, which may be examples of UEs 115 and base stations 140 as described herein. Additionally, the process flow 600 may include a repository 602 (e.g., a database) storing one or more learning models for AI-enabled ARQ. In the following description of the process flow 600, the operations between the UE 115-*e*, the base station 140-*c*, and the repository 602 may be transmitted in a different order than the example order shown, or the operations performed by the UE 115-*e*, the base station 140-*c*, and the repository 602 may be performed in different orders or at different times. Some operations may also be omitted from the process flow 600, and other operations may be added to the process flow 600.

In the example of FIG. 6, one or more of the UE 115-*e* or the base station 140-*c* may support performing a procedure (e.g., a model configuration procedure), which may include an exchange of a set of one or more configurations (or a set of one or more parameters) associated with one or more learning models for AI-enabled ARQ. The set of one or more configurations (or the set of one or more parameters) associated with the one or more learning models for AI-enabled ARQ may be stored at the repository 602 (e.g., a database, or the like), which the base station 140-*c* may obtain from the repository 602.

At 605, the base station 140-*c* may transmit, and the UE 115-*e* may receive, an RRC configuration message, which may include one or more sets of one or more configurations (or one or more sets of one or more parameters) associated with one or more learning models for AI-enabled ARQ. The base station 140-*c* may transmit, and the UE 115-*e* may receive, the RRC configuration message during an RRC configuration procedure. In some examples, the UE 115-*e* may configure one or more learning models for AI-enabled ARQ via a layer 3 (L3) of the UE 115-*e* and based at least in part on the one or more sets of one or more configurations (or the one or more sets of one or more parameters) received in the RRC configuration message. At 610, the UE 115-*e* may transmit, and the base station 140-*c* may receive, an RRC configuration complete message, for example, based at least in part on the RRC configuration message. The RRC configuration complete message may indicate a completion of the RRC configuration procedure, including configuring of the one or more learning models for AI-enabled ARQ.

In the example of FIG. 6, additionally, or alternatively, at least one configuration of the sets of one or more configurations may be for provisioning network data by the base station 140-*c* to the UE 115-*e* for input to one or more learning models (e.g., AI/ML models). In some examples, the at least one configuration may indicate at least one identifier associated with at least one learning model supporting the network data as input to the least one learning model. In some examples, the UE 115-*c* may request the base station 140-*c* to activate or deactivate provisioning of network data as input to the at least one learning model via a MAC-CE. In some examples, the UE 115-*e* may receive, and the base station 140-*c* may transmit, the network data via a unicast transmission and over a physical downlink channel (e.g., a physical downlink control channel (PDCCH), a physical downlink shared channel (PDSCH)). In some other examples, the UE 115-*e* may receive, and the base station 140-*c* may transmit, the network data via a MAC-CE or an RRC message. In other examples, the UE 115-*e* may receive, and the base station 140-*c* may transmit (e.g., broadcast), the network data via system information or a multicast broadcast service (MBS) transmission.

Additionally, or alternatively, at least one configuration of the sets of one or more configurations may be for provisioning, to the base station 140-*c*, UE data as input for one or more learning models (e.g., AI/ML models). In some examples, the at least one configuration may indicate at least one identifier associated with at least one learning model supporting the UE data as input to the least one learning model. The base station 140-*c* may request, from the UE 115-*e*, to activate or deactivate provisioning of UE data as input to the at least one learning model via a MAC-CE. In some examples, the UE 115-*e* may transmit, and the base station 140-*c* may receive, UE data via a unicast transmission and over a physical uplink channel (e.g., a physical uplink control channel (PUCCH), a physical uplink shared channel (PUSCH)). In some other examples, the UE 115-*e* may transmit, and the base station 140-*c* may receive, the UE data via a MAC-CE or an RRC message.

At 615, the base station 140-*c* may transmit, and the UE 115-*e* may receive, a signal (also referred to as an activation signal or a deactivation signal) for activating or deactivating one or more learning models for AI-enabled ARQ. In some examples, the base station 140-*c* may transmit, and the UE 115-*e* may receive via a layer 2 (L2) of the UE 115-*e*, the signal for activating or deactivating the one or more learning models for AI-enabled ARQ. For example, the base station 140-*c* may transmit, and the UE 115-*e* may receive, a MAC-CE that activates or deactivates the one or more learning models for AI-enabled ARQ. In some examples, activating or deactivating the one or more learning models for AI-enabled ARQ may be based at least in part on a switching event as described herein with reference to FIGS. 3 through 5.

Accordingly, one or more of the UE 115-*e* or the base station 140-*c* may be configured to support managing AI-enabled ARQ based at least in part on activating or deactivating one or more learning models for AI-enabled ARQ via MAC-CE, which allows flexible management of AI-enabled ARQ.

Figure 7:
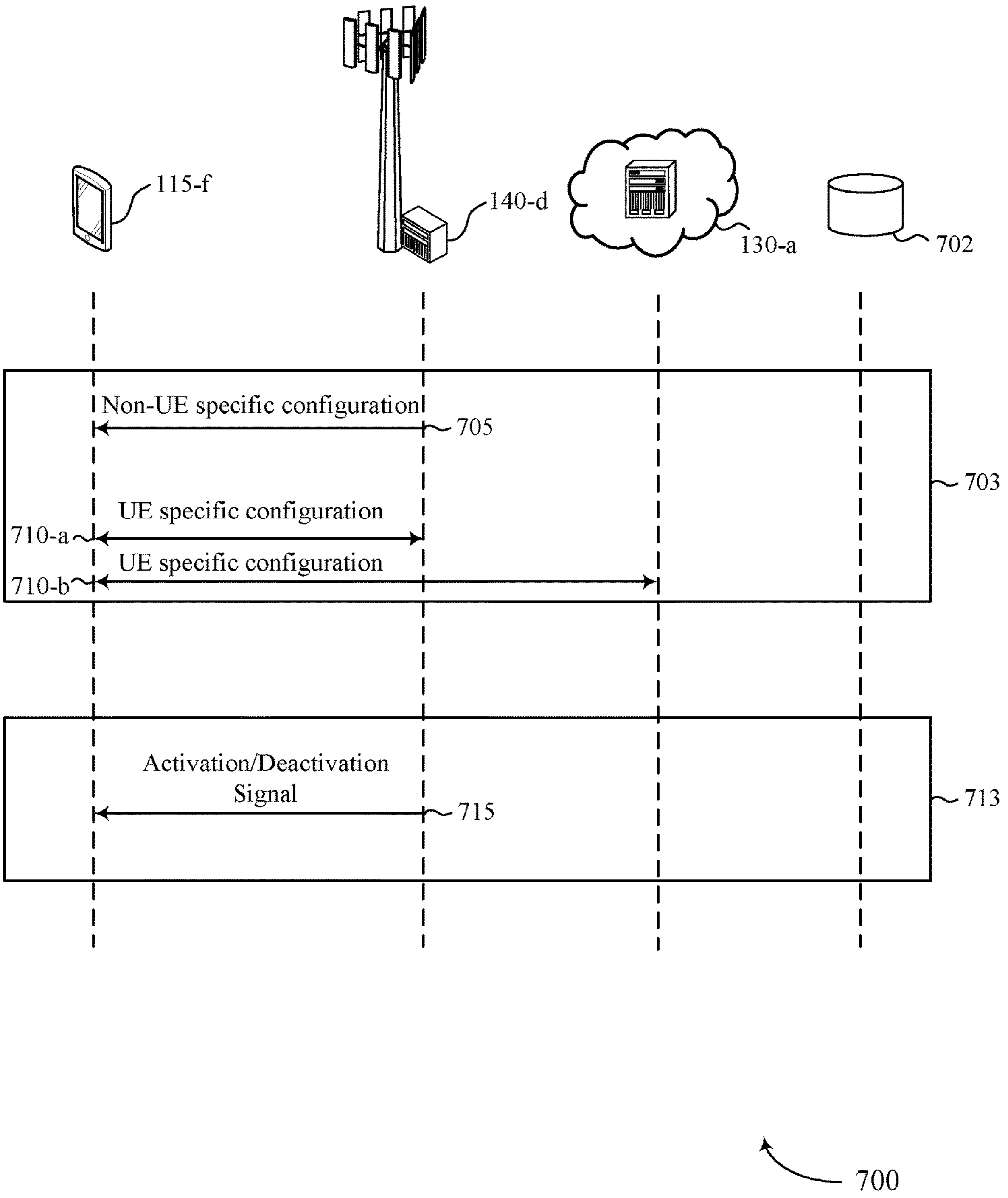

FIG. 7 shows an example of a process flow 700 that supports AI-enabled ARQ in accordance with one or more aspects of the present disclosure. The process flow 700 may implement aspects of the wireless communications system 100 as described with reference to FIG. 1. Additionally, or alternatively, the process flow 700 may implement or be implemented by aspects of the network architecture 200 as described herein with reference to FIG. 2. The process flow 700 may include a UE 115-*f*, a base station 140-*d*, and a core network 130-*a*, which may be respective examples of UEs 115, base stations 140, and core networks 130 as described herein. Additionally, the process flow 700 may include a repository 702 (e.g., a database) storing one or more learning models for AI-enabled ARQ. In the following description of the process flow 700, the operations between the UE 115-*f*, the base station 140-*d*, the core network 130-*a*, and the repository 702 may be transmitted in a different order than the example order shown, or the operations performed by the UE 115-*f*, the base station 140-*d*, the core network 130-*a*, and the repository 702 may be performed in different orders or at different times. Some operations may also be omitted from the process flow 700, and other operations may be added to the process flow 700.

In the example of FIG. 7, one or more of the UE 115-*f*, the base station 140-*d*, or the core network 130-*a* may support performing one or more procedures, which may exchange of a set of one or more configurations (or a set of one or more parameters) associated with one or more learning models for AI-enabled ARQ. For example, one or more of the UE 115-*f*, the base station 140-*d*, or the core network 130-*a* may support performing one or more procedures, which may exchange of the set of one or more configurations (or the set of one or more parameters) associated with the one or more learning models for AI-enabled ARQ based at least in part on a state (e.g., an idle state, an inactivate state) of the UE 115-*f*. In some examples, one or more of the UE 115-*f*, the base station 140-*d*, or the core network 130-*a* may support activating or deactivating the one or more learning models for AI-enabled ARQ for inference during the state of the UE 115-*f*. For example, one or more of the UE 115-*f*, the base station 140-*d*, or the core network 130-*a* may support activating or deactivating the one or more learning models for AI-enabled ARQ to perform an inference (e.g., training) of the one or more learning models for AI-enabled ARQ and cell selection, cell reselection, RLF recovery, measurement operations, random access channel operations (e.g., beam selection, random access channel occasions (RO), and the like).

At 705, the base station 140-*d* may transmit, and the UE 115-*f* may receive, a set of one or more non-UE specific configurations. For example, the base station 140-*d* may broadcast, and the UE 115-*f* may receive, system information including the set of one or more non-UE specific configurations for AI-enabled ARQ. The system information may include a system information block (SIB). The set of one or more non-UE specific configurations may include one or more sets of one or more parameters, which may be associated with a set of one or more learning models for AI-enabled ARQ and include a set of one or more identifiers associated with the set of one or more learning models for AI-enabled ARQ, etc.

Additionally, or alternatively, at 710, the base station 140-*d* may transmit, and the UE 115-*f* may receive, for example, via a unicast transmission, a set of one or more UE specific configurations for AI-enabled ARQ. For example, the base station 140-*d* may transmit, and the UE 115-*f* may receive, an RRC message including a set of one or more UE specific configurations for AI-enabled ARQ. The set of one or more UE specific configurations may include one or more sets of one or more parameters, which may be associated with a set of one or more learning models including a set of one or more identifiers associated with the set of one or more learning models for AI-enabled ARQ. In some examples, the RRC message may be an RRC release message during an RRC release procedure. In some examples, one or more of the UE 115-*f*, the base station 140-*d*, or the core network 130-*a* (e.g., one or more network functions associated with the core network 130-*a*) may exchange one or more NAS messages associated with the set of one or more UE specific configurations.

At 715, the base station 140-*d* may transmit, and the UE 115-*f* may receive, a signal (also referred to as an activation signal or a deactivation signal) for activating or deactivating one or more learning models for AI-enabled ARQ. In some examples, the base station 140-*d* may transmit, and the UE 115-*f* may receive, the signal for activating or deactivating the one or more learning models for AI-enabled ARQ. For example, the base station 140-*d* may transmit, and the UE 115-*f* may receive, a MAC-CE that activates or deactivates the one or more learning models for AI-enabled ARQ and may perform an inference (e.g., training) of the one or more learning models during an idle state or an inactivate state of the UE 115-*f*. As such, activating or deactivating the one or more learning models for AI-enabled ARQ may be based at least in part on the idle state or the inactivate state of the UE 115-*f*.

Accordingly, one or more of the UE 115-*f*, the base station 140-*d*, or the core network 130-*a* may support activating or deactivating one or more learning models for AI-enabled ARQ and for inference of the one or more learning models for AI-enabled ARQ during an idle state or an inactivate state of the UE 115-*f*.

Figure 8:
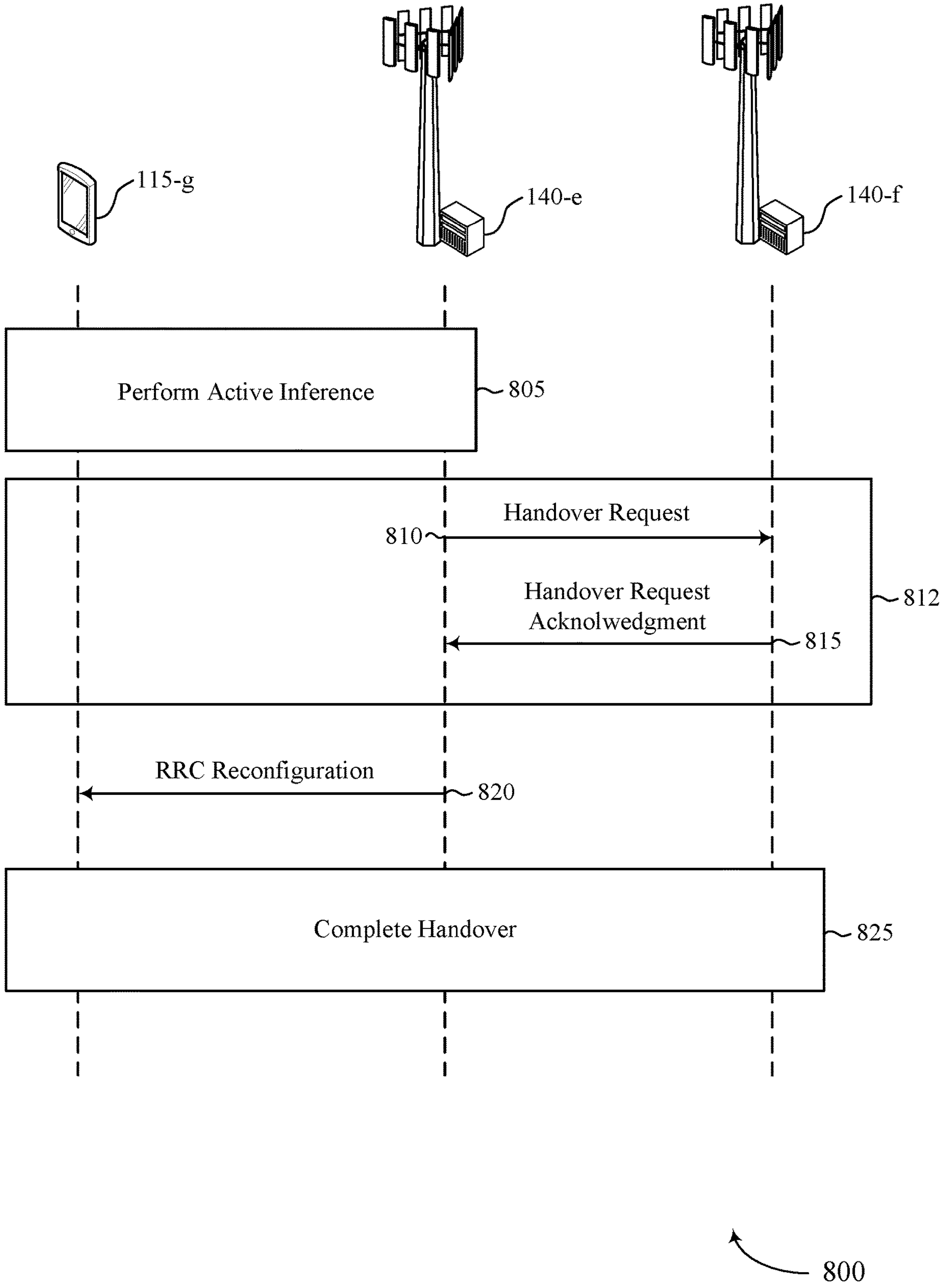

FIG. 8 shows an example of a process flow 800 that supports AI-enabled ARQ in accordance with one or more aspects of the present disclosure. The process flow 800 may implement aspects of the wireless communications system 100 as described with reference to FIG. 1. Additionally, or alternatively, the process flow 800 may implement or be implemented by aspects of the network architecture 200 as described herein with reference to FIG. 2. The process flow 800 may include a UE 115-*g*, a base station 140-*e*, and a base station 140-*f*, which may be examples of UEs 115 and base stations 140 as described herein. In the following description of the process flow 800, the operations between the UE 115-*g*, the base station 140-*e*, and the base station 140-*f* may be transmitted in a different order than the example order shown, or the operations performed by the UE 115-*g*, the base station 140-*e*, and the base station 140-*f* may be performed in different orders or at different times. Some operations may also be omitted from the process flow 800, and other operations may be added to the process flow 800.

In the example of FIG. 8, one or more of the UE 115-*g*, the base station 140-*e*, and the base station 140-*f* may support managing AI-enabled ARQ during a mobility (also referred to as UE mobility) of the UE 115-*g*. More specifically, one or more of the UE 115-*g*, the base station 140-*e*, and the base station 140-*f* may support managing AI/ML functionality for AI-enabled ARQ associated with the UE 115-*g* during a handover procedure, which may include switching (e.g., transferring) a connection of the UE 115-*g* from the base station 140-*e* (also referred to as a source base station) to the base station 140-*f* (also referred to as a target base station) and while maintaining ongoing AI/ML functionality for AI-enabled ARQ.

At 805, one or more of the UE 115-*g* or the base station 140-*e* may perform an active inference (e.g., training) of one or more learning models for AI-enabled ARQ. The inference (e.g., training) of the one or more learning models for AI-enabled ARQ may be based at least in part on one or more sets of one or more configurations for AI-enabled ARQ, including one or more sets of one or more parameters, configured by the base station 140-*e*.

At 810, the base station 140-*e* may transmit, and the base station 140-*f* may receive, a handover request message, which may include context information (e.g., AI/ML context) associated with the one or more learning models for AI-enabled ARQ. At 815, the base station 140-*f* may transmit, and the base station 140-*e* may receive, a handover request acknowledgment message, which may include one or more sets of one or more configurations for AI-enabled ARQ, including one or more sets of one or more parameters, configured by the base station 140-*f*. Put another way, the base station 140-*f* may provide a set of one or more AI/ML configurations for the UE 115-*g* to apply after being handed over to the base station 140-*f* by the base station 140-*e*. In some examples, the base station 140-*e* may determine the sets of one or more configurations for AI-enabled ARQ, including the one or more sets of one or more parameters, based at least in part on the context information (e.g., AI/ML context) received from the base station 140-*f*. Additionally, or alternatively, the base station 140-*e* may determine the sets of one or more configurations for AI-enabled ARQ, including the one or more sets of one or more parameters, based at least in part on one or more of UE capabilities of the UE 115-*g* or network capabilities of the base station 140-*f*. In some examples, one or more of the UE 115-*g* or the base station 140-*f* may support partial or full AI/ML functionality (e.g., enabling of one or more features associated with at least one learning model).

At 820, the base station 140-*e* may transmit, and the UE 115-*g* may receive, an RRC reconfiguration message, which include the sets of one or more configurations for AI-enabled ARQ, including the one or more sets of one or more parameters, configured by the base station 140-*f*. At 825, one or more of the UE 115-*g*, the base station 140-*e*, or the base station 140-*f* may complete the handover procedure.

Accordingly, one or more of the UE 115-*g*, the base station 140-*e*, or the base station 140-*f* may support managing AI-enabled ARQ during a mobility of the UE 115-*g*.

Figure 9:
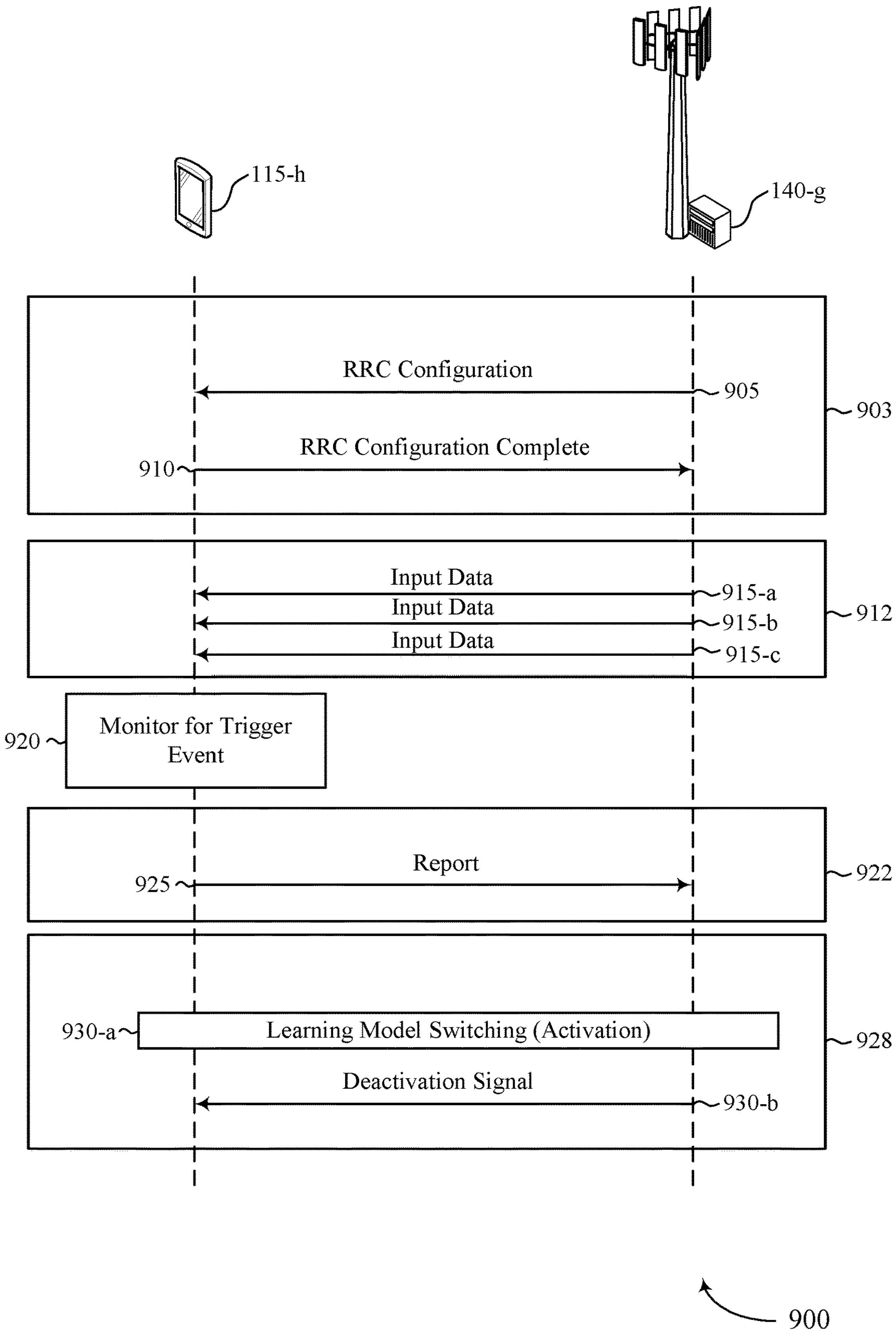

FIG. 9 shows an example of a process flow 900 that supports AI-enabled ARQ in accordance with one or more aspects of the present disclosure. The process flow 900 may implement aspects of the wireless communications system 100 as described with reference to FIG. 1. Additionally, or alternatively, the process flow 900 may implement or be implemented by aspects of the network architecture 200 as described herein with reference to FIG. 2. The process flow 900 may include a UE 115-*h* and a base station 140-*g*, which may be examples of UEs 115 and base stations 140 as described herein. In the following description of the process flow 900, the operations between the UE 115-*h* and the base station 140-*g* may be transmitted in a different order than the example order shown, or the operations performed by the UE 115-*h* and the base station 140-*g* may be performed in different orders or at different times. Some operations may also be omitted from the process flow 900, and other operations may be added to the process flow 900.

In the example of FIG. 9, one or more of the UE 115-*h* or the base station 140-*g* may support activating and deactivating one or more learning models for AI-enabled ARQ based at least in part on reporting of feedback associated with the one or more learning models for AI-enabled ARQ by the UE 115-*h*.

At 905, the base station 140-*g* may transmit, and the UE 115-*h* may receive, an RRC message that includes a set of one or more RRC configurations, which may include a set of one or more parameters. In some examples, one or more parameters of the set of one or more parameters may include one or more performance KPIs or one or more system KPIs, or a combination thereof. In some other examples, one or more parameters of the set of one or more parameters may include one or more monitoring events (e.g., thresholds, conditions). In other examples, one or more parameters of the set of one or more parameters may include one or more reporting events, reporting periodicity, etc. At 910, the UE 115-*h* may transmit, and the base station 140-*g* may receive, an RRC configuration complete message.

At 915, the base station 140-*g* may transmit, and the UE 115-*h* may receive, input data, which may be input for one or more learning models for AI-enabled ARQ at the UE 115-*h*. In some examples, the base station 140-*g* may transmit, and the UE 115-*h* may receive, input data via one or more unicast transmissions. In some other examples, the base station 140-*g* may broadcast, and the UE 115-*h* may receive, input data via one or more broadcast transmissions as described herein with reference to FIGS. 3 through 8.

At 920, the UE 115-*h* may monitor for one or more events (e.g., threshold satisfied, conditions satisfied) associated with the one or more learning models for AI-enabled ARQ. At 925, the UE 115-*h* may transmit, and the base station 140-*g* may receive, a report based at least in part on the one or more events. The report may indicate the one or more performance KPIs or the one or more system KPIs, or a combination thereof.

At 930-*a*, one or more of the UE 115-*h* or the base station 140-*g* may switch between one or more learning models for AI-enabled ARQ as described herein. For example, one or more of the UE 115-*h* or the base station 140-*g* may active at least one learning model of the one or more learning models for AI-enabled ARQ based at least in part on the reported one or more performance KPIs or the reported one or more system KPIs, or a combination thereof. Additionally, or alternatively, at 930-*b*, one or more of the UE 115-*h* or the base station 140-*g* may activate or deactivate at least one learning model of the one or more learning models for AI-enabled ARQ based at least in part on the reported one or more performance KPIs or the reported one or more system KPIs, or a combination thereof.

Accordingly, one or more of the UE 115-*h* or the base station 140-*g* may support activating and deactivating one or more learning models for AI-enabled ARQ based at least in part on reported feedback associated with the one or more learning models for AI-enabled ARQ by the UE 115-*h*.

Figure 10:
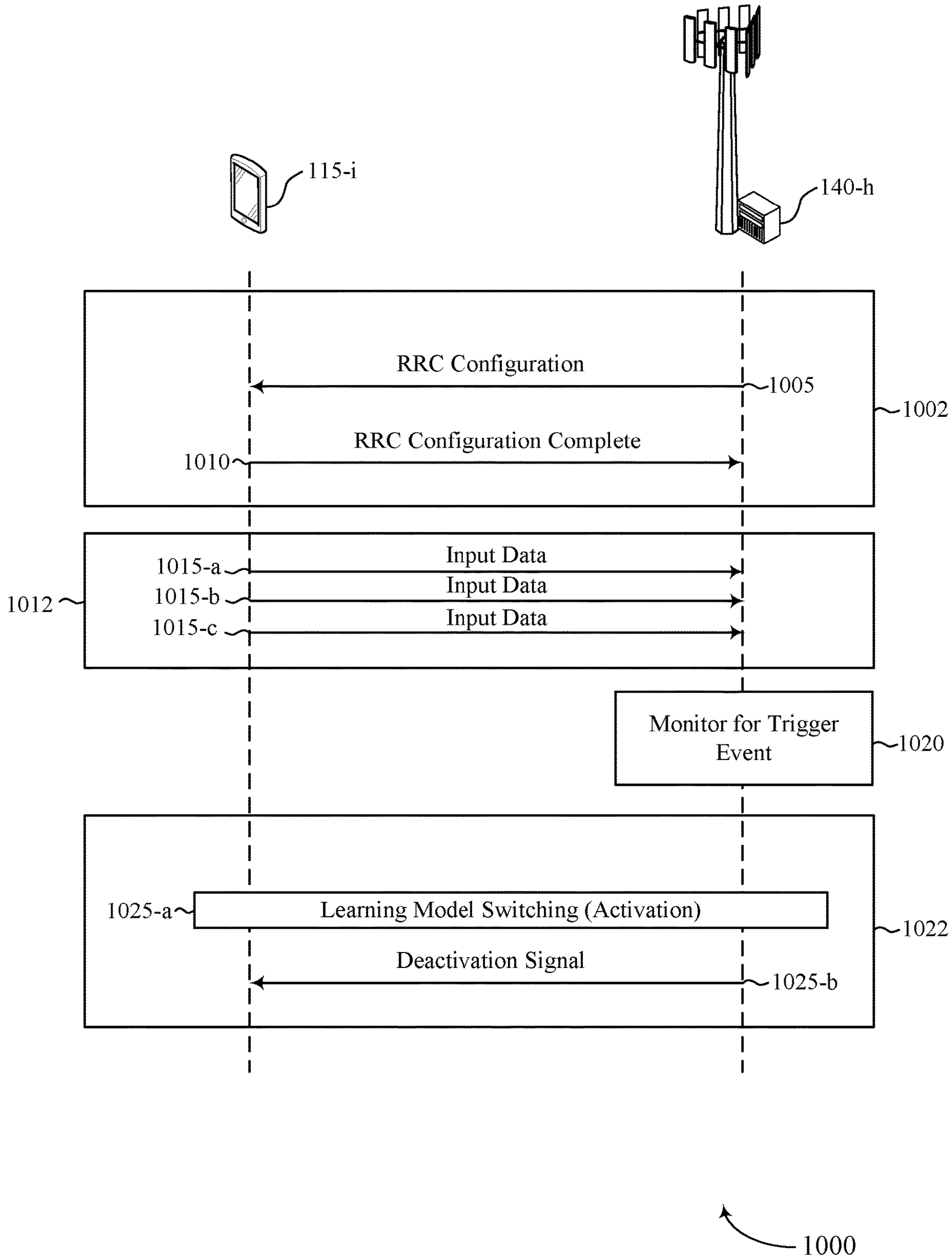

FIG. 10 shows an example of a process flow 1000 that supports AI-enabled ARQ in accordance with one or more aspects of the present disclosure. The process flow 1000 may implement aspects of the wireless communications system 100 as described with reference to FIG. 1. Additionally, or alternatively, the process flow 1000 may implement or be implemented by aspects of the network architecture 200 as described herein with reference to FIG. 2. The process flow 1000 may include a UE 115-*i* and a base station 140-*h*, which may be examples of UEs 115 and base stations 140 as described herein. In the following description of the process flow 1000, the operations between the UE 115-*i* and the base station 140-*h* may be transmitted in a different order than the example order shown, or the operations performed by the UE 115-*i* and the base station 140-*h* may be performed in different orders or at different times. Some operations may also be omitted from the process flow 1000, and other operations may be added to the process flow 1000.

In the example of FIG. 10, one or more of the UE 115-*i* or the base station 140-*h* may support activating and deactivating one or more learning models for AI-enabled ARQ based at least in part on monitoring by the base station 140-*h* of the one or more learning models for AI-enabled ARQ.

At 1005, the base station 140-*h* may transmit, and the UE 115-*i* may receive, an RRC message that includes set of one or more RRC configurations, which may include a set of one or more parameters. In some examples, one or more parameters of the set of one or more parameters may include one or more performance KPIs or one or more system KPIs, or a combination thereof. At 1010, the UE 115-*i* may transmit, and the base station 140-*h* may receive, an RRC configuration complete message.

At 1015, the base station 140-*h* may receive, and the UE 115-*i* may transmit, input data, which may be input for one or more learning models for AI-enabled ARQ at the base station 140-*h*. In some examples, the base station 140-*h* may receive, and the UE 115-*i* may transmit, input data via one or more unicast transmissions. At 1020, the base station 140-*h* may monitor for one or more events (e.g., threshold satisfied, conditions satisfied) associated with the one or more learning models for AI-enabled ARQ at the base station 140-*h*.

At 1025-*a*, one or more of the UE 115-*i* or the base station 140-*h* may switch between one or more learning models for AI-enabled ARQ based at least in part on the one or more events as described herein. For example, one or more of the UE 115-*i* or the base station 140-*h* may active at least one learning model of the one or more learning models for AI-enabled ARQ based at least in part on the one or more events as described herein. Additionally, or alternatively, at 1025-*b*, one or more of the UE 115-*i* or the base station 140-*h* may deactivate at least one learning model of the one or more learning models for AI-enabled ARQ based at least in part on the one or more events as described herein.

Accordingly, one or more of the UE 115-*i* or the base station 140-*h* may support activating and deactivating one or more learning models for AI-enabled ARQ based at least in part on monitoring by the base station 140-*h* of the one or more learning models for AI-enabled ARQ.

Figure 11:
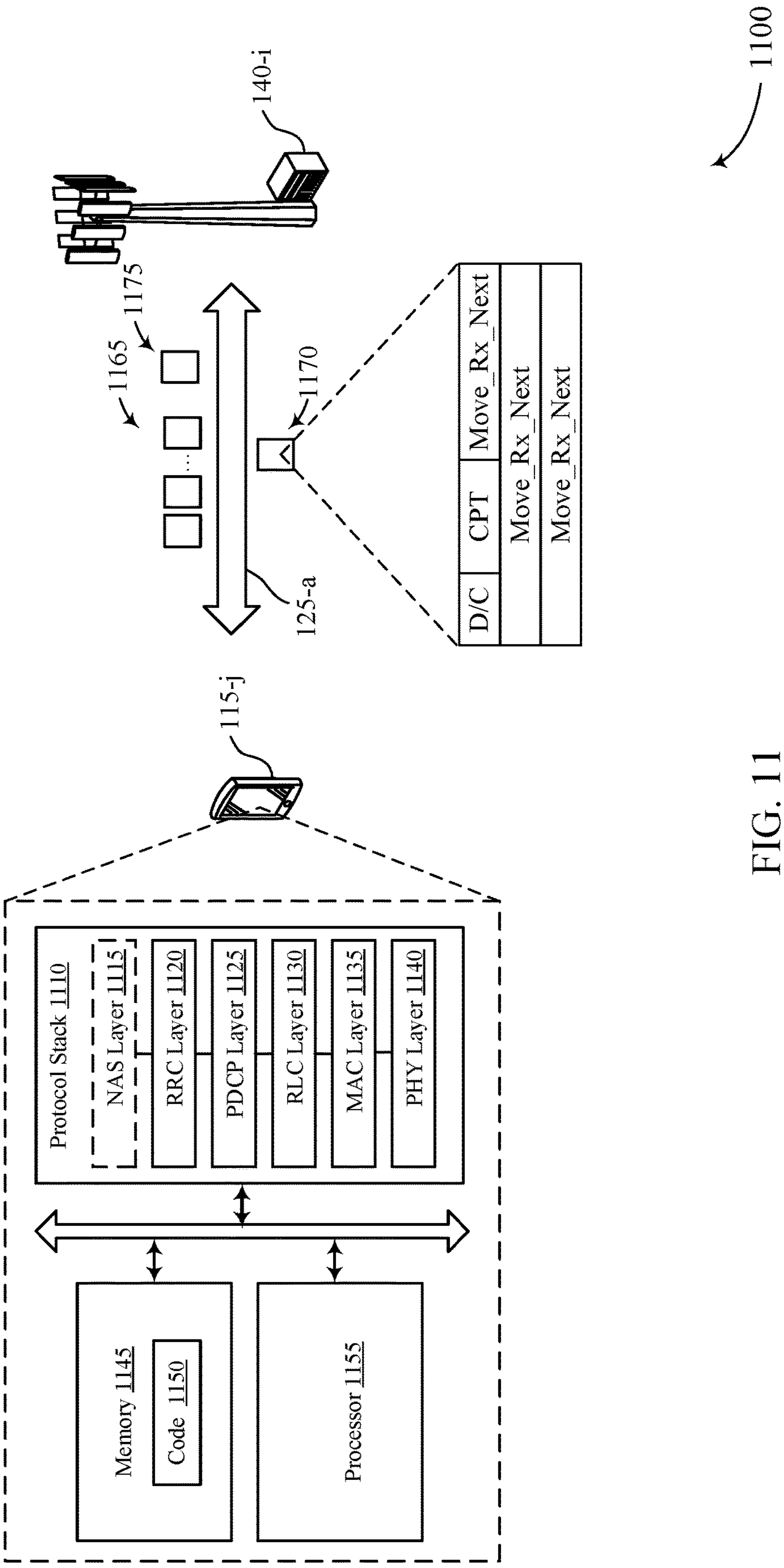
FIG. 11 shows an example of a wireless communications system that supports AI-enabled ARQ in accordance with one or more aspects of the present disclosure.

FIG. 11 shows an example of a wireless communications system 1100 that supports AI-enabled ARQ in accordance with one or more aspects of the present disclosure. In some examples, the wireless communications system 1100 may implement or be implemented by aspects of the wireless communications system 100 as described herein with reference to FIG. 1. Additionally, or alternatively, the wireless communications system 1100 may implement or be implemented by aspects of the network architecture 200 as described herein with reference to FIG. 2. For example, the wireless communications system 1100 may include a UE 115-*j* and a base station 140-*i*, which may be an example of UEs 115 and base stations 140 as described herein with reference to FIG. 1. The wireless communications system 1100 may support 3G, 4G, 5G, or radio access technologies beyond 5G.

The UE 115-*j* and the base station 140-*i* may perform wireless communication (e.g., one or more of receiving, obtaining, transmitting, or outputting one or more of control information or data) via a communication link 125-*a*, which may be examples of communications links 125 as described herein with reference to FIG. 1. In the example of FIG. 11, the UE 115-*j* may be equipped (e.g., configured) with at least one protocol stack 1110 to support one or more of receiving, obtaining, transmitting, or outputting one or more of control information or data. The at least one protocol stack 1110 may include one or more protocol layers, which may be ordered in a hierarchical architecture. In some examples, the at least one protocol stack 1110 may be associated with one or more of a control plane (and may be referred to as a control plane protocol stack) or a user plane (and may be referred to as a user plane protocol stack). The at least one protocol stack 1110 may include one or more of a NAS layer 1115, an RRC layer 1120, a PDCP layer 1125, an RLC layer 1130, a MAC layer 1135, or a PHY layer 1140.

The NAS layer 1115 may be capable of, configured to, or operable to support mobility, authentication, and bearer management for the UE 115-*j* served by the base station 140-*i*. The RRC layer 1120 may be capable of, configured to, or operable to support establishment, configuration, and maintenance of a connection between the UE 115-*j* and the base station 140-*i* supporting radio bearers for user plane data. Additionally, the RRC layer 1120 may be capable of, configured to, or operable to support establishment, configuration, and maintenance of a connection between a network entity 105 or a core network 130 supporting radio bearers for user plane data as described herein with reference to FIG. 1. The PDCP layer 1125 may be capable of, configured to, or operable to support header compression, in-sequence delivery, ciphering and integrity protection, transfer of user plane and control plane data, removal of duplicates. Additionally, or alternatively, PDCP layer 1125 may be capable of, configured to, or operable to support routing the split barriers.

The RLC layer 1130 may be capable of, configured to, or operable to support transfer of upper layer PDUs according one or more modes, including: AM, UN, and TM. The RLC layer 1130 may perform error correction through ARQ, concatenation, segmentation, and reassembly of RLC SDUs, re-segmentation of RLC data PDUs, reordering of RLC data PDUs, duplicate detection, RLC re-establishment and protocol error detection and recovery. The RLC layer 1130 of the UE 115-*j* may receive RLC SDU from and/or transmit to upper protocol layers (e.g., the PDCP layer 1125) of the at least one protocol stack 1110 of the UE 115-*j*, and transmit and/or receive RLC PDU to and/or from a peer RLC entity, for example, of the base station 140-*i* via lower layers (e.g., the PHY layer 1140) of the at least one protocol stack 1110 of the UE 115-*j*.

In some cases, the RLC layer 1130 of the UE 115-*j* may experience excessive losses of RLC SDUs in the UM, particularly when relying solely on HARQ. In some other cases, the RLC layer 1130 of the UE 115-*j* may experience increased latency due to retransmission (e.g., each retransmission may be associated with a reassembly timer), resegmentation, reordering delay, etc. associated with RLC SDUs and RLC data PDUs in the AM. In some cases, this may cause high variability in round-trip delay (RTT) and excess usage of memory 1145 of the UE 115-*j*. In some other cases, this may cause the RLC layer 1130 of the UE 115-*j* to declare an RLF because certain thresholds or buffer limitations (e.g., of memory 1145 of the UE 115-*j*) being reached at the RLC layer 1130 of the UE 115-*j* as described herein.

The MAC layer 1135 may be capable of, configured to, or operable to support priority handling and multiplexing of logical channels into transport channels. Additionally, the MAC layer 1135 may be capable of, configured to, or operable to support error detection techniques, error correction techniques, or both to support retransmissions to improve link efficiency. The PHY layer 1140 may be capable of, configured to, or operable to support mapping transport channels to physical channels. Additionally, the PHY layer 1140 may be capable of, configured to, or operable to support coding/decoding, modulation/demodulation, multi-antenna mapping, etc.

The UE 115-*j* may be equipped with memory 1145 and processor 1155. One or more of the at least one protocol stack 1110, memory 1145, or processor 1155 may be in electronic communication or otherwise coupled (e.g., operatively, communicatively, functionally, electronically, electrically) via one or more buses (or interfaces). The memory 1145 may store computer-readable, computer-executable, or processor-executable code, such as code 1150. The processor 1155 may include one or more intelligent hardware devices (e.g., one or more general-purpose processors, one or more DSPs, one or more central processing units (CPUs), one or more graphics processing units (GPUs), one or more neural processing units (NPUs)), or any combination thereof).

The processor 1155 may be configured to execute computer-readable instructions stored in the memory 1145 to cause the UE 115-*j* to perform various functions. For example, the code 1150 may include instructions that, when executed by the at least one processor 1160, causes the UE 115-*j* (e.g., one or more protocol layers of the at least one protocol stack 1110) to perform various functions (e.g., operations, actions, etc.) described herein. For example, the code 1150 may be associated with one or more learning models (e.g., AI/ML models). In the example of FIG. 11, the code 1150 may include instructions that, when executed by the at least one processor 1160, causes the UE 115-*j* (e.g., one or more protocol layers of the at least one protocol stack 1110) to process one or more PDUs (also referred to as RLC SDUs and/or RLC data PDUs) according to one or more learning models (e.g., one or more AI/ML models). The one or more learning models (e.g., one or more AI/ML models) may improve efficient processing (e.g., discarding, retransmitting, decoding) of one or more PDUs at the RLC layer 1130 of the at least one protocol stack 1110 of the UE 115-*j*.

In the example of FIG. 11, the base station 140-*i* may receive, and the UE 115-*j* may transmit, a report including capability information that indicates whether the UE 115-*j* supports AI/ML functionality as described herein with reference to FIG. 4. For example, the base station 140-*i* may transmit, and the UE 115-*j* may receive, a UE capability enquiry. In response to the UE capability enquiry message, the UE 115-*j* may transmit, and the base station 140-*i* may receive, UE capability information that indicates whether the UE 115-*j* supports AI/ML functionality. In some examples, the UE capability information may include at least one bit field, which may indicate whether the AI/ML functionality is supported by the UE 115-*j*. In some other examples, the UE capability information may indicate whether the UE 115-*j* support partial AI/ML functionality or full AI/ML functionality (e.g., support of one or more actions (e.g., managing parameters associated with functionality of the RLC layer 1130 of the UE 115-*j*) associated with the AI/ML functionality). One or more of an accuracy or performance of the one or more learning models (e.g., one or more AI/ML models) for efficient processing (e.g., discarding, retransmitting, decoding) of one or more PDUs at the RLC layer 1130 of the at least one protocol stack 1110 of the UE 115-*j* may be based at least in part on the UE capability information of the UE 115-*j*.

One or more of the UE 115-*j* or the base station 140-*i* may determine whether to enable or disable (e.g., activate, deactivate) the one or more learning models (e.g., one or more AI/ML models) based at least in part on one or more levels of granularity. A first level of granularity may be associated with one or more of the UE 115-*j* or the base station 140-*i* determining whether to enable or disable (e.g., activate, deactivate) at least one learning model (e.g., AI/ML functionality) at a device level. A second level of granularity may be associated with one or more of the UE 115-*j* or the base station 140-*i* determining whether to enable or disable (e.g., activate, deactivate) the at least one learning model (e.g., AI/ML functionality) for a user plane protocol stack (e.g., the at least one protocol stack 1110). A third level of granularity may be associated with one or more of the UE 115-*j* or the base station 140-*i* determining whether to enable or disable (e.g., activate, deactivate) the at least one learning model (e.g., AI/ML functionality) for a protocol layer (e.g., the PDCP layer 1125, the RLC layer 1130). A fourth level of granularity may be associated with one or more of the UE 115-*j* or the base station 140-*i* determining whether to enable or disable (e.g., activate, deactivate) the at least one learning model (e.g., AI/ML functionality) for at least one parameter of set of one or more parameters, for example, an acknowledgement state variable (e.g., "TX_Next_Ack"), a send state variable (e.g., "TX_Next"), a receive state variable (e.g., "RX_Next"), etc.

The base station 140-*i* may transmit, and the UE 115-*j* may receive, control signaling that indicates a configuration (e.g., an RRC configuration) including a first set of one or more parameters for an ARQ procedure (also referred to as AI-enabled ARQ herein) associated with the RLC layer 1130 of the UE 115-*j*. The ARQ procedure may be associated with transmissions of PDUs and uses ACK or NACK to determine whether retransmission of one or more PDUs is needed. For example, if the RLC layer 1130 of the UE 115-*j* receives a NACK that indicates unsuccessful reception of one or more PDUs at the base station 140-*i*, the RLC layer 1130 of the UE 115-*j* may perform a re-transmission of the one or more PDUs. received a data packet, respectively. In some examples, the base station 140-*i* may transmit, and the UE 115-*j* may receive, the control signaling that indicates the configuration in response to the UE capability information of the UE 115-*j*. The first set of one or more parameters may include a parameter (e.g., "max_drop"), which may indicate a maximum (e.g., threshold) number of PDUs (or SDUs) the UE 115-*j* may drop during a time window (also referred to as a "Dropping Window"). The first set of one or more parameters may include a parameter (e.g., "Dropping Window"), which may indicate the time window, in which the UE 115-*j* counts a number of PDUs (or SDUs) for the max_drop. The first set of one or more parameters may include a parameter (e.g., "RLFThreshold"), which may indicate a maximum (e.g., threshold) number of retransmissions the UE 115-*j* may perform during a time window (also referred to as an "RLFWindow"). The first set of one or more parameters may include a parameter (e.g., "RLFWindow"), which may indicate the time window, in which the UE 115-*j* may count a number of PDUs (or SDUs) to determine whether to declare an RLF. The first set of one or more parameters may include a parameter (e.g., "minRetxThreshold"), which may indicate a minimum (e.g., threshold) number of retransmissions that the UE 115-*j* needs to attempt before dropping a PDU (or SDU) or declaring an RLF. The first set of one or more parameters may include a parameter (e.g., "AIML_Allowed"), which may enable or disable AI/ML functionality at the UE 115-*j*. The first set of one or more parameters may include a parameter (e.g., "QoSFlowAllowed"), which may indicate one or more data traffic flows (e.g., QoS flows) for which the UE 115-*j* may apply AI/ML functionality.

The UE 115-*j* may be capable of, configured to, or operable to disable AI/ML functionality for a first subset of RLC states (also referred to as boundary states or boundary conditions) of a set of RLC states and/or a second subset of RLC states (also referred to as AI native states or AI native conditions) of the set of RLC states. The base station 140-*i* may transmit, and the UE 115-*j* may receive, control signaling that indicates a configuration (e.g., an RRC configuration) that identifies one or more of the first subset of RLC states (also referred to as boundary states) or the second subset of RLC states (also referred to as AI native states). The configuration may include a parameter (e.g., "decalareRLFStates"), which may indicate one or more conditions for the UE 115-*j* to declare an RLF. In some examples, the parameter may indicate for the UE 115-*j* to declare an RLF based at least in part on a number of retransmissions of one or more PDUs (or one or more SDUs) over a validity window satisfying (e.g., exceeding) a threshold (e.g., "(RLF_threshold").

The configuration may include a parameter (e.g., "RetransmitStates"), which may indicate one or more conditions for the UE 115-*j* to retransmit a PDU (or SDU). In some examples, the parameter may indicate one or more of a minimum retransmission threshold (e.g., "minRetxThreshold") or a maximum retransmission threshold (e.g., "maxRetxThreshold"). In some examples, the UE 115-*j* may drop a PDU (or an SDU) or declare an RLF based at least in part on satisfying the minimum retransmission threshold (e.g., "minRetxThreshold"). In some other examples, the UE 115-*j* may declare an RLF based at least in part on an unsuccessful number of retransmissions of a single PDU (or SDU), wherein the unsuccessful number of retransmissions satisfies the maximum retransmission threshold (e.g., "maxRetxThreshold").

The UE 115-*j* may enable AI/ML functionality to perform one or more operations including a retransmission of a PDU (or an SDU), a drop of the PDU (or the SDU), or a declaration of an RLF based at least in part on a failure of one or more boundary conditions. The configuration may include a parameter (e.g., "DropStates"), which may indicate one or more conditions for the UE 115-*j* to drop a PDU (or SDU). In some examples, the parameter (e.g., "DropStates") may indicate one or more conditions for the UE 115-*j* for dropping a retransmission and reporting to the base station 140-*i* to update (e.g., adjust, modify, move) a reception window (also herein referred to as a reception time window) for receiving PDUs (SDUs). In some other examples, the base station 140-*i* may configure the UE 115-*j* with one or more boundaries (e.g., a lower boundary and/or an upper boundary) associated with a number of PDUs (or SDUs) the UE 115-*j* may drop or how frequently the UE 115-*j* may drop a PDU (or an SDU).

In some examples, the first set of one or more parameters may be an input to one or more learning models (e.g., one or more AI/ML models) for the ARQ procedure associated with the RLC layer 1130 of the UE 115-*j*. In some examples, the UE 115-*j* may be configured with a second set of one or more parameters, which may include each of one or more parameters of the first set of one or more parameters. Each parameter may include a set of values (e.g., a range of values). Put another way, each parameter of the first set of one or more parameters may include a single value, while each parameter of the second set of one or more parameters may include a set of values (e.g., a range of values). Additionally, or alternatively, the base station 140-*i* may transmit, and the UE 115-*j* may receive control signaling that indicates a configuration (e.g., an RRC configuration) including a third set of one or more parameters. The third set of one or more parameters may include at least one performance metric for the ARQ procedure associated with the RLC layer 1130 of the UE 115-*j*.

In the example of FIG. 11, the UE 115-*j* may transmit, and the base station 140-*i* may receive, one or more PDUs of a set of one or more PDUs 1165. In some examples, the UE 115-*j* may receive, and the base station 140-*i* may transmit, at least one negative acknowledgment (NACK) for at least one PDU of the set of one or more PDUs 1165. For example, the UE 115-*j* may initiate the ARQ procedure based at least in part on a polling procedure, in which the UE 115-*j* may receive, from the base station 140-*i*, a status report (e.g., a status PDU), including the at least one NACK for the at least one PDU of the set of one or more PDUs 1165.

The UE 115-*j* may obtain an output of the one or more learning models (e.g., one or more AI/ML models) for the ARQ procedure associated with the RLC layer 1130 of the UE 115-*j* based at least in part on one or more of the first set of one or more parameters or the third set of one or more parameters. The UE 115-*j* may select a value of the set of values for the ARQ procedure associated with the RLC layer 1130 of the UE 115-*j* based at least in part on the output of the one or more learning models (e.g., one or more AI/ML models) for the ARQ procedure associated with the RLC layer 1130 of the UE 115-*j*. In some examples, at least one parameter, including at least one value of the at least one parameter, of the second set of one or more parameters may be the output of the one or more learning models (e.g., one or more AI/ML models) for the ARQ procedure associated with the RLC layer 1130 of the UE 115-*j*. As such, the UE 115-*j* may select the value of the set of values for the ARQ procedure associated with the RLC layer 1130 of the UE 115-*j*. The UE 115-*j* may process the at least one PDU of the set of one or more PDUs 1165, by performing one or more operations including dropping the PDU of the set of one or more PDUs 1165, retransmitting the at least one PDU of the set of one or more PDUs 1165, or declaring an RLF, based at least in part on the at least one NACK for the at least one PDU of the set of one or more PDUs 1165 and according to the selected value of the set of values for the ARQ procedure associated with the RLC layer 1130 of the UE 115-*j*.

Additionally, or alternatively, the first set of one or more parameters may include one or more of at least one radio link condition, at least one HARQ process, at least one status of the RLC layer 1130 of the UE 115-*j*, at least one status of the PDCP layer 1125 of the UE 115-*j*, at least one quality level of at least one parameter of a third set of one or more parameters satisfying a threshold, at least one status of a TCP, or at least on criterion of an application or service associated with the UE 115-*j*. The at least one radio condition may be associated with a line-of-sight propagation of the PDU of the set of one or more PDUs 1165 in which the transmission of the of the PDU of the set of one or more PDUs 1165 may experience minimal attenuation and reflection, or non-line-of-sight propagation of the PDU of the set of one or more PDUs 1165 in which the transmission of the of the PDU of the set of one or more PDUs 1165 may experience attenuation, multipath fading, and scattering, leading to variations in transmission quality of the PDU of the set of one or more PDUs 1165. Other examples of at least one radio condition may be associated with interference.

The at least one HARQ process may be associated with one or more of transmission (e.g., of the PDU of the set of one or more PDUs 1165), reception (e.g., of the PDU of the set of one or more PDUs 1165), retransmission (e.g., of the PDU of the set of one or more PDUs 1165), etc. The at least one status of the PDCP layer 1125 of the UE 115-*j* may indicate one or more PDCP state variables of the PDCP layer 1125 of the UE 115-*j* associated with processing (e.g., dropping, retransmitting) of the PDU of the set of one or more PDUs 1165.

The quality level of at least one parameter of a third set of one or more parameters satisfying a threshold may indicate an accuracy or effectiveness of the at least one parameter. The at least one status of a TCP, which may indicate whether the TCP is enabled or disabled. The TCP enables the transfer of the set of one or more PDUs 1165 between the UE 115-*j* and the base station 140-*i*. The at least on criterion of an application or service associated with the UE 115-*j* may indicate a latency requirement, a reliability requirement, or both, of the application or service associated with the UE 115-*j*.

The UE 115-*j* may map one or more of the first set of one or more parameters or the third set of one or more parameters to the second set of one or more parameters via the one or more learning models (e.g., one or more AI/ML models). For example, the one or more learning models (e.g., one or more AI/ML models) may determine an operation (e.g., action) for the UE 115-*j* to perform for at least one PDU of the set of one or more PDUs 1165 (e.g., retransmit, drop) and prioritize the at least one PDU of the set of one or more PDUs 1165. Additionally, or alternatively, an output of the one or more learning models (e.g., one or more AI/ML models) for the ARQ procedure associated with the RLC layer 1130 of the UE 115-*j* may be based at least in part on a fourth set of one or more parameters (e.g., thresholds), and the UE 115-*j* may map one or more of the first set of one or more parameters, the third set of one or more parameters, and the fourth set of one or more parameters to the second set of one or more parameters via the one or more learning models (e.g., one or more AI/ML models). The UE 115-*j* may update at least one parameter (e.g., threshold) of the fourth set of one or more parameters (e.g., thresholds) based on a periodicity (e.g., interval, rate), and transmit an indication to the base station 140-*i* of the updated at least one parameter (e.g., threshold). In some examples, the output of the one or more learning models (e.g., one or more AI/ML models) may be different per data traffic flow (e.g., QoS flow), logical channel, or component carrier, or a combination thereof.

The fourth set of one or more parameters may include a parameter (e.g., "MaxRetxThresholdForDropping"), which may indicate a maximum number of retransmissions (e.g., a threshold number of retransmissions) the UE 115-*j* can perform (e.g., attempt) before dropping the at least one PDU of the set of one or more PDUs 1165. The fourth set of one or more parameters may include a parameter (e.g., "RLF_validity_window"), which may indicate a window (also referred to as sliding window) of sequence numbers the UE 115-*j* uses to determine whether one or more RLF thresholds are satisfied. Alternatively, the window may be a number of PDUs, a number of bytes, or a timer. Put another way, the parameter (e.g., "RLF_validity_window") may indicate a transmission window associated with the set of one or more PDUs 1165 and for detecting an RLF. In some examples, the transmission window may correspond to a set of one or more sequence numbers associated with the set of one or more PDUs 1165.

The fourth set of one or more parameters may include a parameter (e.g., "RLF_threshold"), which may indicate a maximum number of retransmissions (e.g., a threshold number of retransmissions) or a maximum number of drops (e.g., a threshold number of drops) the UE 115-*j* may perform before the UE 115-*j* declares an RLF (e.g., over a last N PDUs (SDUs), where N is the RLF_validity_window). The fourth set of one or more parameters may include a parameter (e.g., "MaxRetxThresholdForRLF"), which may indicate a maximum number of retransmissions (e.g., a threshold number of retransmissions) the UE 115-*j* may attempt for a single sequence number before declaring an RLF. The fourth set of one or more parameters may include a parameter (e.g., "RSRP_threshold"), which may indicate a value for RSRP that determines whether the UE 115-*j* activates the parameter MaxRetxThresholdForDropping or the parameter MaxRetxThresholdForRLF.

One or more parameters (e.g., thresholds) of the fourth set of one or more parameters may be dynamic, and the UE 115-*j* may change (e.g., modify, update) the one or more parameters (e.g., thresholds) during one or more modifications periods. Additionally, or alternatively, the UE 115-*j* may autonomously change (e.g., modify, update) the one or more parameters (e.g., thresholds) irrespective of one or more modifications periods. The UE 115-*j* may transmit, and the base station 140-*i* may receive, an indication of the one or more changed parameters (e.g., thresholds).

In the example of FIG. 11, the UE 115-*j* may generate a control PDU 1170, which may include a set of one or more fields. At least one field of the set of one or more fields may include an indication for the base station 140-*i* to update a reception window (e.g., "RX_Next") associated with the set of one or more PDUs 1165, where updating the reception window corresponds to moving the reception window according to at least one sequence number. Put another way, the control PDU 1170 may include one or more control fields (e.g., a data/control (D/C) field that indicates whether the PDU is an RLC data PDU or RLC control PDU), one or more control PDU type (CPT) fields, and a field that indicates whether to update a reception window (e.g., "Move_RX_Next") to a new sequence number. As such, the UE 115-*j* may update the reception window irrespective of a successful transmission of a PDU. Additionally, the UE 115-*j* may update the acknowledgement state variable (e.g., "TX_Next_Ack") to a value of the "Move_RX_Next" indicated in the control PDU 1170. Put another way, the UE 115-*j* may monitor for feedback starting from the sequence number where the reception window was moved. The UE 115-*j* may deactivate and reset a polling retransmit timer (e.g., "t-PollRetransmit").

The UE 115-*j* may transmit, and the base station 140-*i* may receive, report 1175 associated with the one or more learning models (e.g., one or more AI/ML models). The report may include a set of one or more logs associated with processing of one or more PDUs of the set of one or more PDUs 1165 according to the one or more learning models (e.g., one or more AI/ML models). Put another way, the UE 115-*j* may share AI/ML model information with the base station 140-*i* or other network entities as described with reference to FIG. 1.

In some examples, at least one log of the set of one or more logs may indicate one or more parameters (e.g., thresholds) of the fourth set of one or more parameters. That is, based at least in part on an output of the one or more learning models (e.g., one or more AI/ML models) corresponding to one or more parameters (e.g., thresholds) of the fourth set of one or more parameters, the UE 115-*j* may log and share the one or more parameters (e.g., thresholds) with the base station 140-*i*.

In some other examples, at least one log of the set of one or more logs may indicate actions performed by the UE 115-*j* on one or more PDUs (RLC SDUs) of the set of one or more PDUs 1165. For example, at least one log of the set of one or more logs may indicate transmitted, retransmitted, and/or dropped PDUs (RLC SDUs), as well as a reason (or cause) of any declared RLFs. Additionally, or alternatively, the at least one log of the set of one or more logs may indicate statistics related to the number of successful transmissions of PDUs (RLC SDUs) and/or drops of PDUs (RLC SDUS) over a retransmission number of PDUs (RLC SDUs).

In other examples, at least one log of the set of one or more logs may indicate one or more satisfied KPIs. For example, if one or more learning models (e.g., one or more AI/ML models) require the UE 115-*j* to have a threshold transmission rate (e.g., 99.9%) of PDUs (SDUs) for a certain packet delay budget, the UE 115-*j* may report a satisfaction level of that KPI. Put another way, at least one log of the set of one or more logs may indicate a percentage corresponding to successful transmissions of the set of one or more PDUs 1165 within the packet delay budget.

In some other examples, at least one log of the set of one or more logs may indicate a performance metric associated with the one or more learning models (e.g., one or more AI/ML models) determined by the UE 115-*j* based on processing the set of one or more PDUs 1165. For example, the UE 115-*j* may share a model accuracy with the base station 140-*i*, such as how many PDUs of the set of one or more PDUs 1165 (SDUs) the UE 115-*j* expects to deliver in time compared to how many were delivered according to the one or more learning models (e.g., one or more AI/ML models), i.e., estimated packet delay budget-bound compared to actual packet delay budget. In some examples, the base station 140-*i* may configure or reconfigure an RLC layer of the base station 140-*i* based at least in part on the reported AI/ML model information. For example, without coordination between the UE 115-*j* and the base station 140-*i*, a number of PDUs (SDUs) dropped by each of the UE 115-*j* and the base station 140-*i* may be unequal and may cause a greater total of number of PDUs (SDUs) dropped, which may degrade performance. By sharing AI/ML model information (e.g., state sharing), the UE 115-*j* and the base station 140-*i* may coordinate processing of PDUs to ensure efficient applicability of the one or more learning models (e.g., one or more AI/ML models).

Accordingly, the wireless communications system 1100, including one or more of the UE 115-*j* or the base station 140-*i* may support processing of PDUs (RLC SDUs and/or RLC data PDUs) according to a learning model (e.g., an AI/ML model) for AI-enabled ARQ, the UE 115-*j* or the base station 140-*i*, may experience reduced latency due to early termination of retransmission of PDUs (RLC SDUs and/or RLC data PDUs), among other examples. It should be understood that alternative techniques may be realized to support improvement one or more aspects of the present disclosure.

Figure 12:
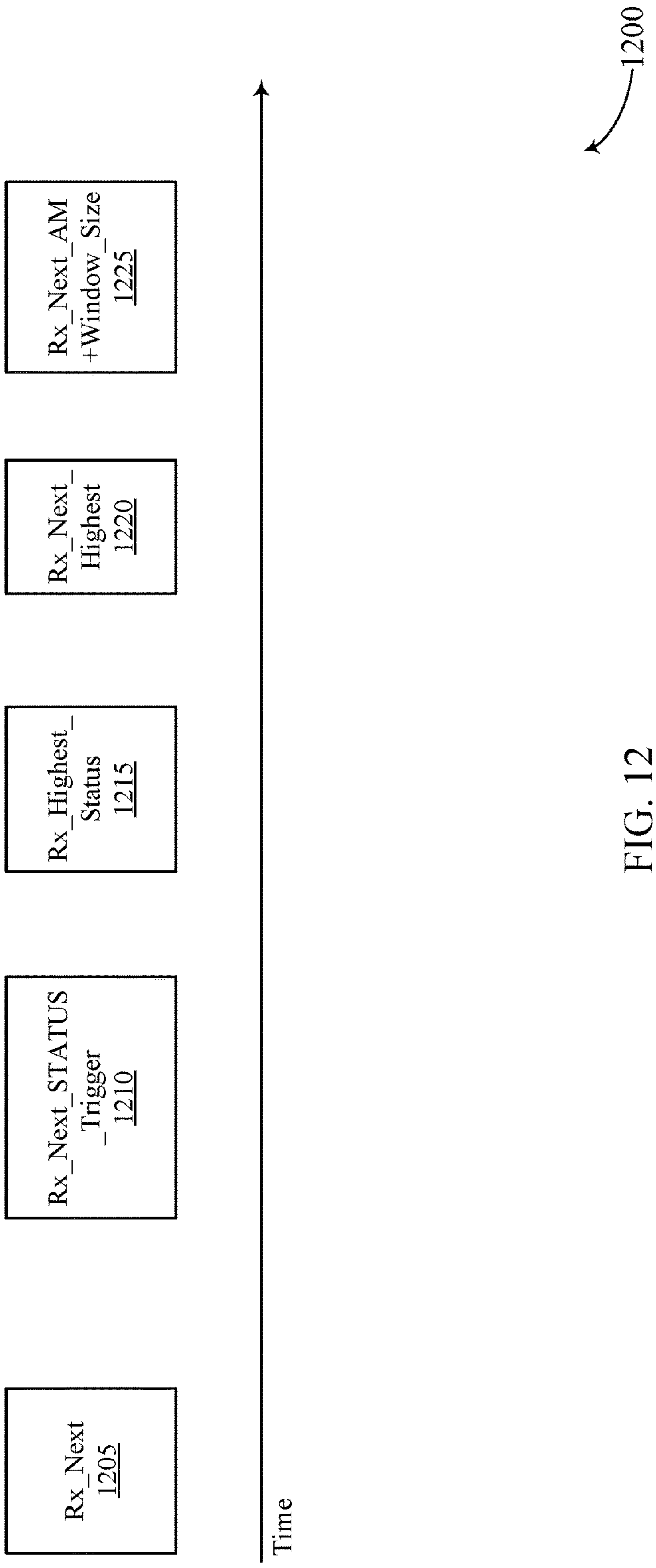
FIG. 12 shows an example of a method that supports AI-enabled ARQ in accordance with one or more aspects of the present disclosure.

FIG. 12 shows an example of a method 1200 that supports AI-enabled ARQ in accordance with one or more aspects of the present disclosure. The operations of the method 1200 may be implemented by a wireless device or its components as described herein. For example, the operations of the method 1200 may be performed by a network entity 105, a base station 140, or a UE 115 as described with reference to FIGS. 1 through 11. In some examples, a network entity 105, a base station 140, or a UE 115 may execute a set of instructions to control the functional elements of the network entity 105, the base station 140, or the UE 115 to perform the described functions. Additionally, or alternatively, the network entity 105, the base station 140, or the UE 115 may perform aspects of the described functions using special-purpose hardware.

The method 1200 may be associated with one or more RLC state variables (also referred to as status parameters), including one or more of an Rx_Next 1205 state variable, an Rx_Next_Status_Trigger 1210 state variable, an Rx_Highest_Status 1215 state variable, an Rx_Next_Highest 1220 state variable, and an Rx_Next+_AM_Window_Size 1225 state variable.

The Rx_Next 1205 state variable holds a value of a sequence number following the last in-sequence completely received PDU (RLC SDU), and it serves as the lower edge of a reception window. The value of the Rx_Next 1205 state variable may be initially set to 0 and may be updated whenever an RLC entity (e.g., of the network entity 105, the base station 140, or the UE 115) receives a PDU (RLC SDU) with a sequence number equal to value of the Rx_Next 1205 state variable (i.e., SN=RX_Next). The Rx_Next_Status_Trigger 1210 state variable holds a value of a sequence number following the sequence number of the PDU (RLC SDU) that triggered a reassembly timer (e.g., "t-Reassembly"). The Rx_Highest_Status 1215 state variable holds the highest possible value of the sequence number, which can be indicated by "ACK_SN" when a Status PDU has to be constructed as described herein with reference to FIG. 11. The Rx_Highest_Status 1215 state variable may be initially set to 0. The Rx_Next_Highest 1220 state variable may hold a value of the sequence number following the sequence number of the PDU (RLC SDU) with the highest sequence number among received PDUs (RLC SDUs). The Rx_Next_Highest 1220 state variable may be initially set to 0.

In the example of FIG. 11, one or more of the network entity 105, the base station 140, or the UE 115 may update the Rx_Next 1205 state variable to a sequence number associated with a first PDU (RLC SDU) of a set of one or more PDUs with a sequence number greater than x (e.g., sequence number>x), where x represents a positive integer, for which one or more information bits or bytes have not been received. In some examples, if x is greater than or equal to the Rx_Next_Highest 1220 state variable, then one or more of the network entity 105, the base station 140, or the UE 115 may update the Rx_Next_Highest 1220 state variable to x+1. In some examples, if a timer (e.g., represented by a reassembly parameter "t-reassembly") is running and the Rx_Next_STATUS_trigger 1210 state variable is less than or equal to x, one or more of the network entity 105, the base station 140, or the UE 115 may stop and reset the timer. Additionally, one or more of the network entity 105, the base station 140, or the UE 115 may stop and reset another timer (e.g., "t-StatusProhibit"). One or more of the network entity

105, the base station 140, or the UE 115 may set the Rx_Next_STATUS_trigger 1210 state variable to x+1. As such, one or more of the network entity 105, the base station 140, or the UE 115 may update the Rx_Next+_AM_Window_Size 1225 state variable.

Figure 13:
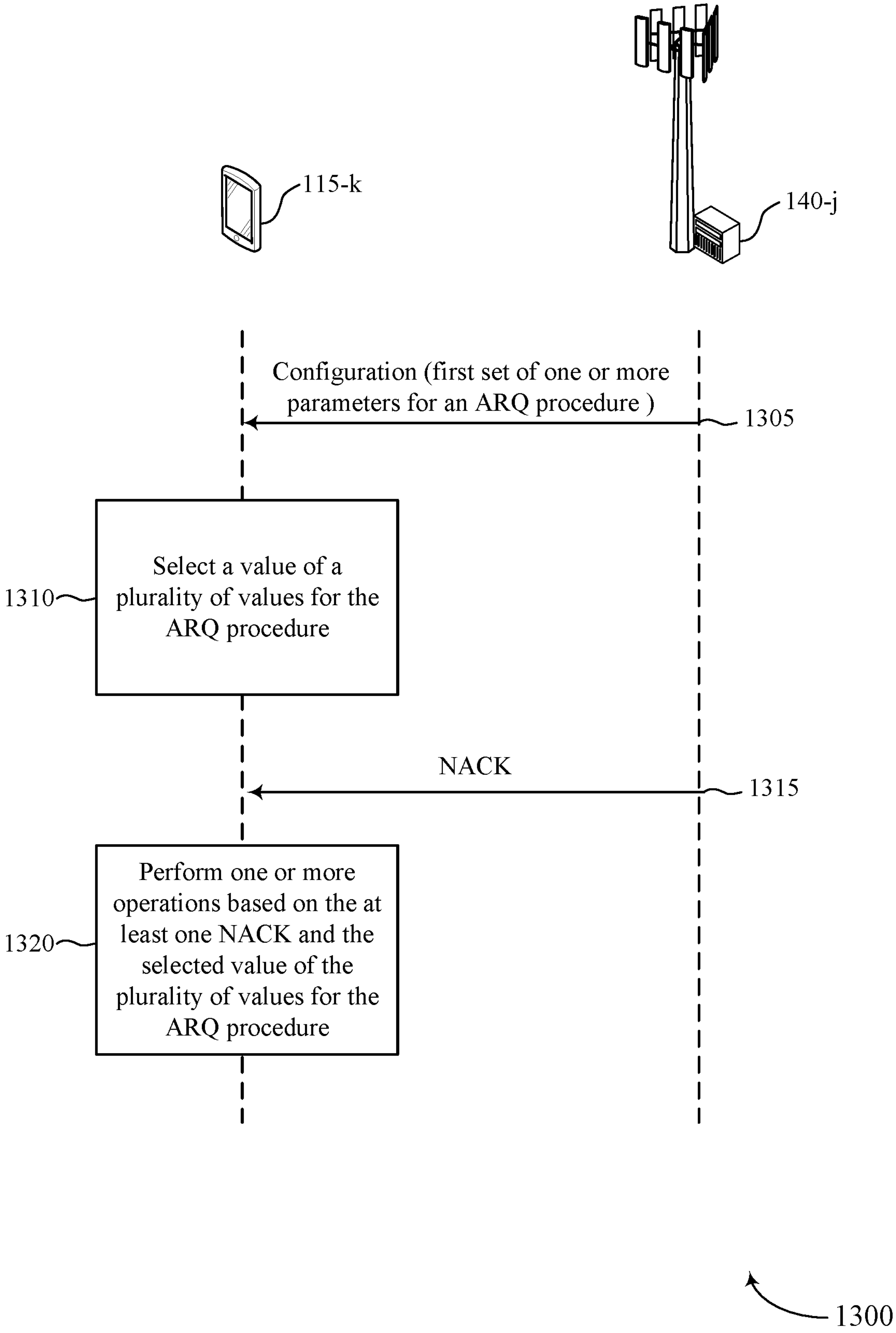
FIG. 13 shows an example of a process flow that supports AI-enabled ARQ in accordance with one or more aspects of the present disclosure.

FIG. 13 shows an example of a process flow 1300 that supports AI-enabled ARQ in accordance with one or more aspects of the present disclosure. The process flow 1300 may implement aspects of the wireless communications system 100 as described with reference to FIG. 1. Additionally, or alternatively, the process flow 1300 may implement or be implemented by aspects of the network architecture 200 as described herein with reference to FIG. 2. The process flow 1300 may include a UE 115-*k* and a base station 140-*j*, which may be examples of UEs 115 and base stations 140 as described herein. In the following description of the process flow 1300, the operations between the UE 115-*k* and the base station 140-*j* may be transmitted in a different order than the example order shown, or the operations performed by the UE 115-*k* and the base station 140-*j* may be performed in different orders or at different times. Some operations may also be omitted from the process flow 1300, and other operations may be added to the process flow 1300.

At 1305, the base station 140-*j* may transmit, and the UE 115-*k* may receive, control signaling that indicates a configuration including a first set of one or more parameters for an ARQ procedure associated with an RLC entity of the UE 115-*k*. At least one parameter of the first set of one or more parameters is associated with a plurality of values. At 1310, the UE 115-*k* may select a value of the plurality of values for the ARQ procedure associated with the RLC entity of the UE 115-*k* based at least in part on a second set of one or more parameters.

At 1315, the base station 140-*j* may transmit, and the UE 115-*k* may receive, at least one NACK for at least one PDU of a set of one or more PDUs associated with the RLC entity of the UE 115-*k*. At 1320, the UE 115-*k* may perform one or more operations based on the at least one NACK and the selected value of the plurality of values for the ARQ procedure. The one or more operations may include a drop of the at least one PDU, a retransmission of the at least one PDU, or a declaration of a radio link failure.

Figure 14:
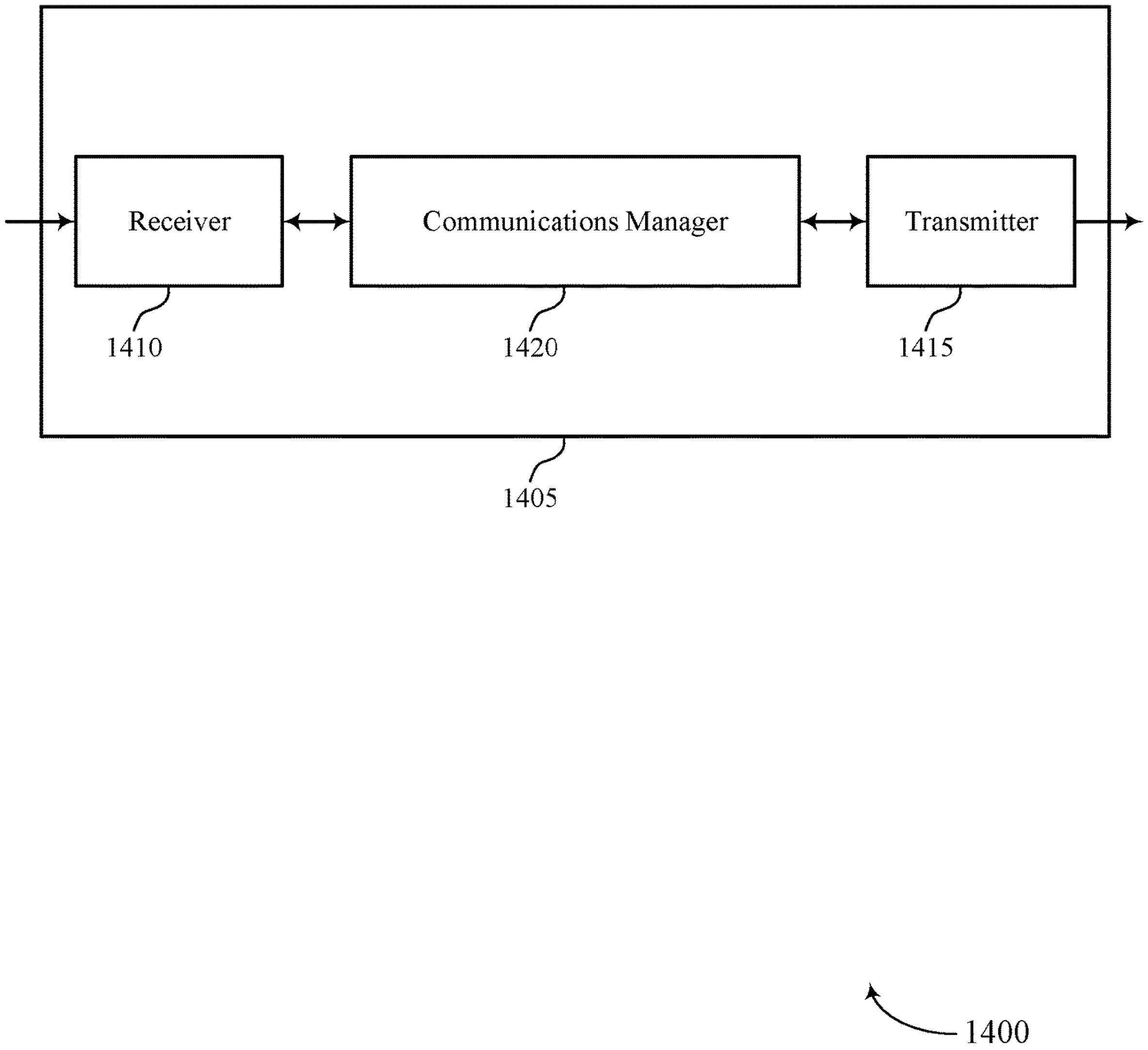
FIGS. 14 and 15 show block diagrams of devices that support AI-enabled ARQ in accordance with one or more aspects of the present disclosure.

FIG. 14 shows a block diagram 1400 of a device 1405 that supports AI-enabled ARQ in accordance with one or more aspects of the present disclosure. The device 1405 may be an example of aspects of a UE 115 as described herein. The device 1405 may include a receiver 1410, a transmitter 1415, and a communications manager 1420. The device 1405, or one or more components of the device 1405 (e.g., the receiver 1410, the transmitter 1415, the communications manager 1420), may include at least one processor, which may be coupled with at least one memory, to, individually or collectively, support or enable the described techniques. Each of these components may be in communication with one another (e.g., via one or more buses).

The receiver 1410 may provide a means for receiving information such as packets, user data, control information, or any combination thereof associated with various information channels (e.g., control channels, data channels, information channels related to AI-enabled ARQ). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to AI-enabled ARQ). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations or components thereof may be examples of means for performing various aspects of AI-enabled ARQ as described herein. For example, the communications manager 1420, the receiver 1410, the transmitter 1415, or various combinations or components thereof may be capable of performing one or more of the functions described herein.

In some examples, the communications manager 1420, the receiver 1410, the transmitter 1415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1420, the receiver 1410, the transmitter 1415, or various combinations or components thereof may be implemented in code (e.g., as communications management software or firmware) executed by at least one processor (e.g., referred to as a processor-executable code). If implemented in code executed by at least one processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications in accordance with examples as disclosed herein. For example, the communications manager 1420 is capable of, configured to, or operable to support a means for receiving control signaling that indicates a configuration including a first set of one or more parameters for an ARQ procedure associated with an RLC entity of the device 1405, where at least one parameter of the first set of one or more parameters is associated with a set of multiple values. The communications manager 1420 is capable of, configured to, or operable to support a means for selecting a value of the set of multiple values for the ARQ procedure based on a second set of one or more parameters. The communications manager 1420 is capable of, configured to, or operable to support a means for receiving at least one NACK for at least one PDU of a set of one or more PDUs associated with the RLC entity of the device 1405. The communications manager 1420 is capable of, configured to, or operable to support a means for performing one or more operations based on the at least one NACK for the at least one PDU and the selected value of the set of multiple values for the ARQ procedure, wherein the one or more operations includes a drop of the at least one PDU, a retransmission of the at least one PDU, or a declaration of an RLF.

By including or configuring the communications manager 1420 in accordance with examples as described herein, the device 1405 (e.g., at least one processor controlling or otherwise coupled with the receiver 1410, the transmitter 1415, the communications manager 1420, or a combination thereof) may support techniques for reduced processing, reduced power consumption, and more efficient utilization of communication resources.

Figure 15:
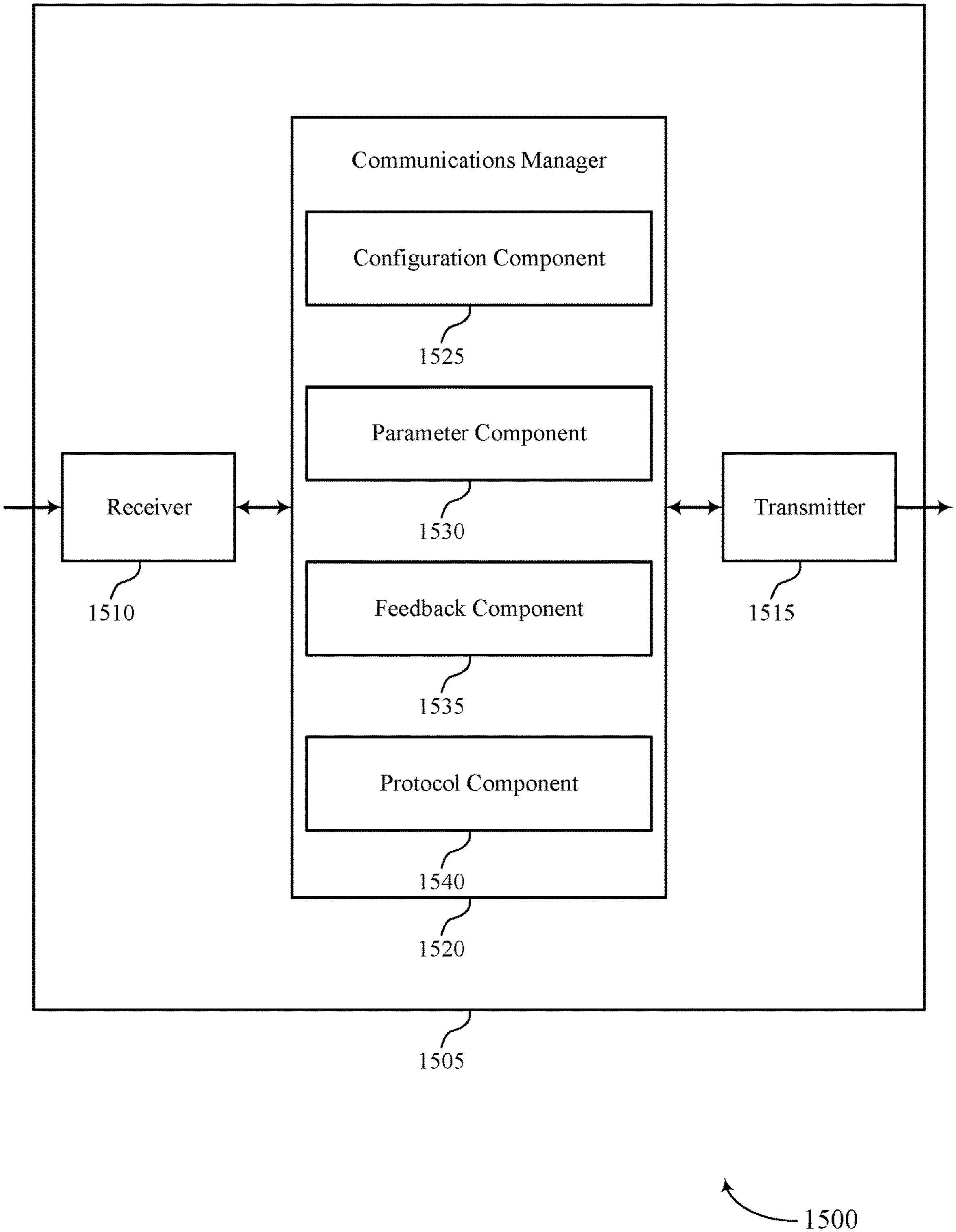

FIG. 15 shows a block diagram 1500 of a device 1505 that supports AI-enabled ARQ in accordance with one or more aspects of the present disclosure. The device 1505 may be an example of aspects of a device 1405 or a network entity 105, a base station 140, or a UE 115 as described herein. The device 1505 may include a receiver 1510, a transmitter 1515, and a communications manager 1520. The device 1505, or one of more components of the device 1505 (e.g., the receiver 1510, the transmitter 1515, the communications manager 1520), may include at least one processor, which may be coupled with at least one memory, to support the described techniques. Each of these components may be in communication with one another (e.g., via one or more buses).

The receiver 1510 may provide a means for receiving information such as packets, user data, control information, or any combination thereof associated with various information channels (e.g., control channels, data channels, information channels related to AI-enabled ARQ). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to AI-enabled ARQ). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of AI-enabled ARQ as described herein. For example, the communications manager 1520 may include a configuration component 1525, a parameter component 1530, a feedback component 1535, a protocol component 1540, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications in accordance with examples as disclosed herein. The configuration component 1525 is capable of, configured to, or operable to support a means for receiving control signaling that indicates a configuration including a first set of one or more parameters for an ARQ procedure associated with an RLC entity of the device 1505, where at least one parameter of the first set of one or more parameters is associated with a set of multiple values. The parameter component 1530 is capable of, configured to, or operable to support a means for selecting a value of the set of multiple values for the ARQ procedure based on a second set of one or more parameters. The feedback component 1535 is capable of, configured to, or operable to support a means for receiving at least one NACK for at least one PDU of a set of one or more PDUs associated with the RLC entity of the device 1505. The protocol component 1540 is capable of, configured to, or operable to support a means for performing one or more operations based on the at least one NACK for the at least one PDU and the selected value of the set of multiple values for the ARQ procedure, wherein the one or more operations includes a drop of the at least one PDU, a retransmission of the at least one PDU, or a declaration of an RLF.

Figure 16:
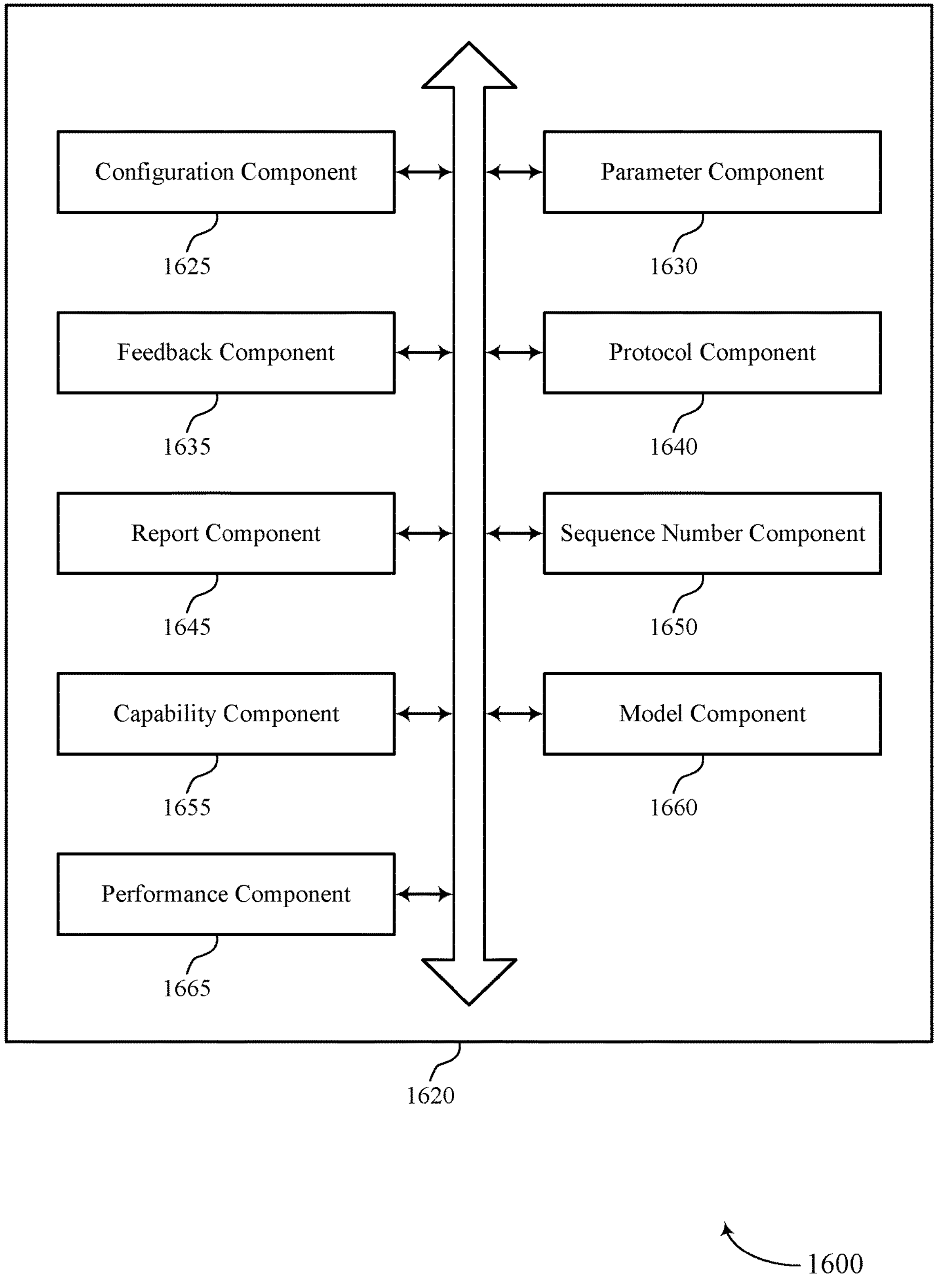
FIG. 16 shows a block diagram of a communications manager that supports AI-enabled ARQ in accordance with one or more aspects of the present disclosure.

FIG. 16 shows a block diagram 1600 of a communications manager 1620 that supports AI-enabled ARQ in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of AI-enabled ARQ as described herein. For example, the communications manager 1620 may include a configuration component 1625, a parameter component 1630, a feedback component 1635, a protocol component 1640, a report component 1645, a sequence number component 1650, a capability component 1655, a model component 1660, a performance component 1665, or any combination thereof. Each of these components, or components or subcomponents thereof (e.g., one or more processors, one or more memories), may communicate, directly or indirectly, with one another (e.g., via one or more buses).

The communications manager 1620 may support wireless communications in accordance with examples as disclosed herein. The configuration component 1625 is capable of, configured to, or operable to support a means for receiving control signaling that indicates a configuration including a first set of one or more parameters for an ARQ procedure associated with an RLC entity of the wireless device, where at least one parameter of the first set of one or more parameters is associated with a set of multiple values. The parameter component 1630 is capable of, configured to, or operable to support a means for selecting a value of the set of multiple values for the ARQ procedure based on a second set of one or more parameters. The feedback component 1635 is capable of, configured to, or operable to support a means for receiving at least one NACK for at least one PDU of a set of one or more PDUs associated with the RLC entity of the wireless device. The protocol component 1640 is capable of, configured to, or operable to support a means for performing one or more operations based on the at least one NACK for the at least one PDU and the selected value of the set of multiple values for the ARQ procedure, wherein the one or more operations includes a drop of the at least one PDU, a retransmission of the at least one PDU, or a declaration of an RLF.

In some examples, the protocol component 1640 is capable of, configured to, or operable to support a means for transmitting, via the RLC entity of the wireless device, an indication to a second RLC entity of a second wireless device for updating a reception window associated with the set of one or more PDUs. In some examples, the protocol component 1640 is capable of, configured to, or operable to support a means for performing the one or more operations based on the indication.

In some examples, the protocol component 1640 is capable of, configured to, or operable to support a means for generating a control PDU including a set of one or more fields, where at least one field of the set of one or more fields includes the indication, where updating the reception window corresponds to moving the reception window according to at least one sequence number. In some examples, the protocol component 1640 is capable of, configured to, or operable to support a means for transmitting, to the second wireless device, the control PDU. In some examples, the sequence number component 1650 is capable of, configured to, or operable to support a means for updating a sequence number associated with at least one second PDU based on the indication, where the sequence number corresponds to the at least one sequence number.

In some examples, the indication serves as a trigger to update a third set of one or more parameters associated with the second RLC entity of the second wireless device. In some examples, the third set of one or more parameters includes a sequence number parameter associated with the set of one or more PDUs, a reassembly parameter associated with the set of one or more PDUs, or a status parameter associated with the set of one or more PDUs.

In some examples, the first set of one or more parameters includes an input to a learning model for the ARQ procedure. In some examples, the second set of one or more parameters includes an output of the learning model for the ARQ procedure. In some examples, the parameter component 1630 is capable of, configured to, or operable to support a means for selecting the value of the set of multiple values for the ARQ procedure based on the input to the learning model and the output of the learning model.

In some examples, the configuration component 1625 is capable of, configured to, or operable to support a means for receiving, from a second wireless device, control signaling including a configuration that indicates a third set of one or more parameters, where the configuration includes an RRC configuration, and where the third set of one or more parameters includes at least one performance metric for the ARQ procedure In some examples, the parameter component 1630 is capable of, configured to, or operable to support a means for applying the third set of one or more parameters to the learning model for ARQ procedure.

In some examples, the model component 1660 is capable of, configured to, or operable to support a means for obtaining the output from the learning model based on one or more of the first set of one or more parameters or the third set of one or more parameters and on a mapping of one or more of the first set of one or more parameters or the third set of one or more parameters to the second set of one or more parameters. In some examples, the output indicates at least one parameter of the second set of one or more parameters.

In some examples, the at least one parameter corresponds to at least one of the one or more operations.

In some examples, the output from the learning model is based at least in part on a fourth set of one or more parameters. In some examples, the fourth set of one or more parameters is based at least in part on one or more of the first set of one or more parameters or the third set of one or more parameters. In some examples, at least one parameter of the fourth set of one or more parameters indicates: a first threshold quantity of retransmissions for the at least one PDU, wherein the first threshold quantity of retransmissions is to be satisfied (e.g., met, exceeded) before the at least one PDU is dropped, a transmission window associated with the set of one or more PDUs and for detection of an RLF, the transmission window corresponding to a set of one or more sequence numbers associated with the set of one or more PDUs, a second threshold quantity of retransmissions or drops for the set of one or more PDUs, wherein the second threshold quantity of retransmissions or drops is to be satisfied during the transmission window before the RLF is declared, a third threshold quantity of retransmissions for the at least one PDU, wherein the third threshold quantity of retransmissions for the at least one protocol data unit is to be satisfied before the RLF is declared, a RSRP threshold value that serves as a trigger to enable one or more of the first threshold quantity of retransmissions or the third threshold quantity of retransmissions, or an activation or deactivation of the learning model.

In some examples, the parameter component 1630 is capable of, configured to, or operable to support a means for updating at least one parameter of the fourth set of one or more parameters based on a periodicity. In some examples, the parameter component 1630 is capable of, configured to, or operable to support a means for transmitting, to a second wireless device, an indication of the at least one parameter of the fourth set of one or more parameters.

In some examples, the mapping includes an association between one or more of the first set of one or more parameters or the third set of one or more parameters to the second set of one or more parameters according to a data traffic flow associated with the at least one PDU, a logical channel associated with the at least one PDU, or a component carrier associated with the at least one PDU.

In some examples, the report component 1645 is capable of, configured to, or operable to support a means for generating a report associated with the learning model, where the report includes a set of one or more logs associated with processing of one or more PDUs of the set of one or more PDUs according to the learning model. In some examples, the report component 1645 is capable of, configured to, or operable to support a means for transmitting, to a second wireless device, the report associated with the learning model.

In some examples, at least one log of the set of one or more logs indicates a fourth set of one or more parameters corresponding to an output of the learning model.

In some examples, the fourth set of one or more parameters comprises one or more of a first threshold quantity of retransmissions for the at least one PDU, wherein the first threshold quantity of retransmissions is to be satisfied before the at least one PDU is dropped, a transmission window associated with the set of one or more PDUs and for detection of an RLF, the transmission window corresponding to a set of one or more sequence numbers associated with the set of one or more PDUs, a second threshold quantity of retransmissions or drops for the set of one or more PDUs, wherein the second threshold quantity of retransmissions or drops is to be satisfied during the transmission window before the RLF is declared, a third threshold quantity of retransmissions for the at least one PDU, wherein the third threshold quantity of retransmissions for the at least one protocol data unit is to be satisfied before the RLF is declared, or a RSRP threshold value that serves as a trigger to enable one or more of the first threshold quantity of retransmissions or the third threshold quantity of retransmissions.

In some examples, at least one log of the set of one or more logs indicates one or more of a quantity of retransmissions associated with the set of one or more PDUs, a quantity of drops associated with the set of one or more PDUs, or a quantity of RLFs associated with the set of one or more PDUs.

In some examples, at least one log of the set of one or more logs includes an indication that the RLC entity of the wireless device satisfies at least one parameter of a third set of one or more parameters for a packet delay budget. In some examples, the at least one parameter includes a threshold quantity of successful transmissions of the set of one or more PDUs. In some examples, the indication includes a percentage corresponding to successful transmissions of the set of one or more PDUs within the packet delay budget.

In some examples, the performance component 1665 is capable of, configured to, or operable to support a means for determining a performance metric associated with the learning model based on processing the set of one or more PDUs according to the learning model. In some examples, the performance metric may indicate a difference between an expected quantity of PDU transmissions of the set of one or more PDUs and an actual quantity of PDU transmissions of the set of one or more PDUs.

In some examples, the capability component 1655 is capable of, configured to, or operable to support a means for transmitting, to a second wireless device, a report including capability information that indicates whether the wireless device supports the learning model, the capability information including one or more of at least one bit field, and where the capability information is based on a performance metric associated with the learning model. In some examples, the control signaling that indicates the configuration may be received based on the capability information that indicates whether the wireless device supports the learning model.

In some examples, the protocol component 1640 is capable of, configured to, or operable to support a means for determining at least two states associated with the RLC entity of the wireless device, where. In some examples, a first state of the at least two states corresponds to a set of one or more conditions associated with processing the set of one or more PDUs irrespective of the learning model. In some examples, a second state of the at least two states corresponds to processing the set of one or more PDUs according to the learning model. In some examples, the configuration includes an indication of the set of one or more conditions associated with processing the set of one or more PDUs irrespective of the learning model. In some examples, the set of one or more conditions includes a first condition to be satisfied before the RLF is declared, a second condition to be satisfied before the retransmission of the at least one PDU, or a third condition to be satisfied before the at least one PDU is dropped.

In some examples, to support receiving the at least one NACK for at least one PDU, the report component 1645 is capable of, configured to, or operable to support a means for obtaining, via the RLC entity of the wireless device, a status report including the at least one NACK for the at least one PDU. In some examples, the at least one PDU includes a header that indicates a sequence number associated with the at least one PDU. In some examples, the status report is based on the sequence number associated with the at least one PDU. In some examples, the first set of one or more parameters includes one or more of at least one radio link condition, at least one HARQ process, at least one status of the RLC entity of the wireless device, at least one status of a PDCP entity of the wireless device, at least one quality level of at least one parameter of a third set of one or more parameters satisfying a threshold, at least one status of a TCP, or at least on criterion of an application or service associated with the wireless device.

Figure 17:
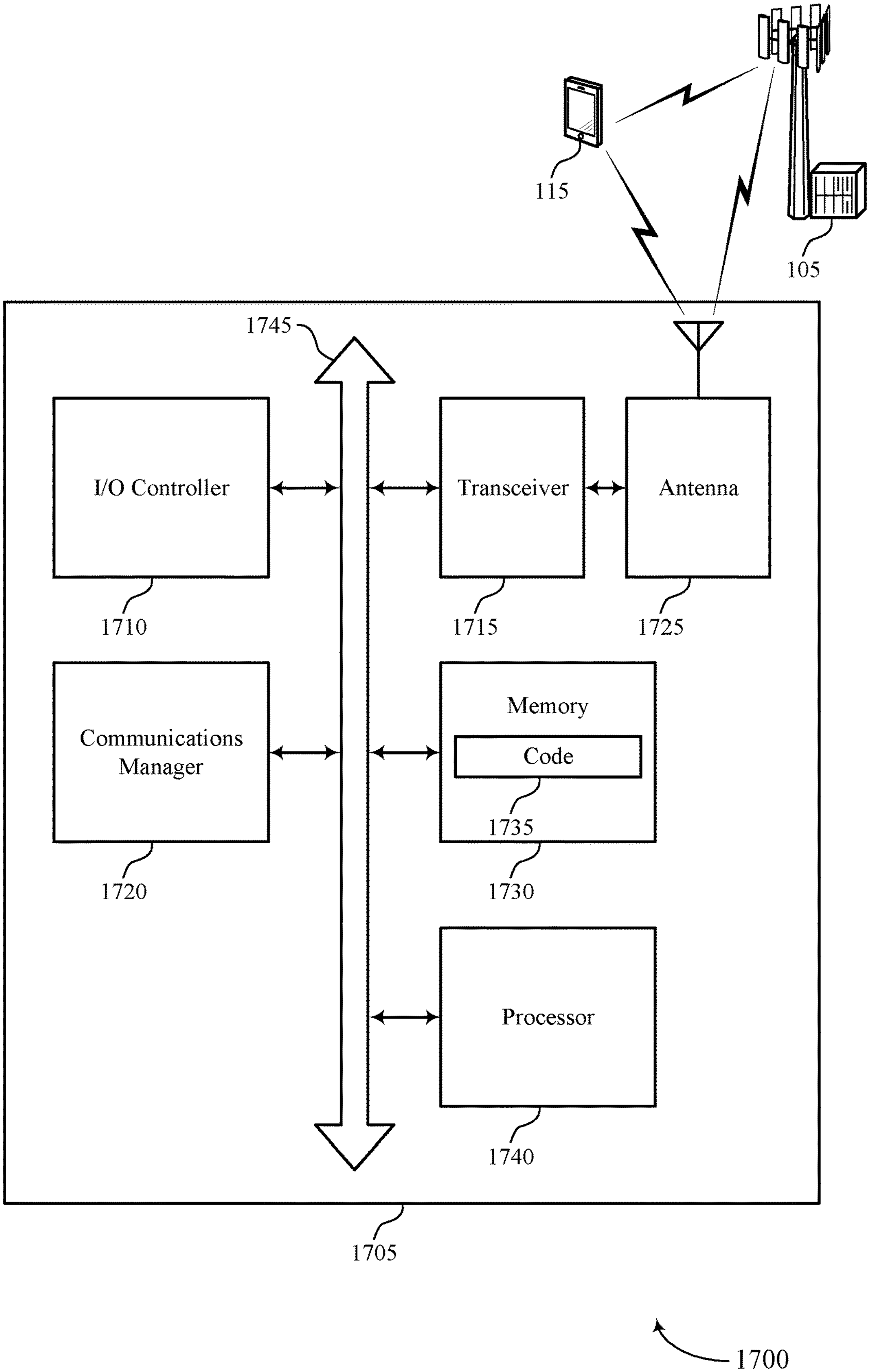
FIG. 17 shows a diagram of a system including a device that supports AI-enabled ARQ in accordance with one or more aspects of the present disclosure.

FIG. 17 shows a diagram of a system 1700 including a device 1705 that supports AI-enabled ARQ in accordance with one or more aspects of the present disclosure. The device 1705 may be an example of or include components of a device 1405, a device 1505, or a network entity 105, a base station 140, or a UE 115 as described herein. The device 1705 may communicate (e.g., wirelessly) with one or more other devices (e.g., network entities 105, base stations 140, UEs 115, or a combination thereof). The device 1705 may include components for bi-directional voice and data communications including components for transmitting and receiving communications, such as a communications manager 1720, an input/output (I/O) controller, such as an I/O controller 1710, a transceiver 1715, one or more antennas 1725, at least one memory 1730, code 1735, and at least one processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of one or more processors, such as the at least one processor 1740. In some cases, a user may interact with the device 1705 via the I/O controller 1710 or via hardware components controlled by the I/O controller 1710.

In some cases, the device 1705 may include a single antenna. However, in some other cases, the device 1705 may have more than one antenna, which may be capable of concurrently transmitting or receiving multiple wireless transmissions. The transceiver 1715 may communicate bi-directionally via the one or more antennas 1725 using wired or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The at least one memory 1730 may include random access memory (RAM) and read-only memory (ROM). The at least one memory 1730 may store computer-readable, computer-executable, or processor-executable code, such as the code 1735. The code 1735 may include instructions that, when executed by the at least one processor 1740, cause the device 1705 to perform various functions described herein. The code 1735 may be stored in a non-transitory computer-readable medium such as system memory or another type of memory. In some cases, the code 1735 may not be directly executable by the at least one processor 1740 but may cause a computer (e.g., when compiled and executed) to perform functions described herein. In some cases, the at least one memory 1730 may include, among other things, a basic I/O system (BIOS) which may control basic hardware or software operation such as the interaction with peripheral components or devices.

The at least one processor 1740 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1740 may be configured to operate a memory array using a memory controller. In some other cases, a memory controller may be integrated into the at least one processor 1740. The at least one processor 1740 may be configured to execute computer-readable instructions stored in a memory (e.g., the at least one memory 1730) to cause the device 1705 to perform various functions (e.g., functions or tasks supporting AI-enabled ARQ). For example, the device 1705 or a component of the device 1705 may include at least one processor 1740 and at least one memory 1730 coupled with or to the at least one processor 1740, the at least one processor 1740 and the at least one memory 1730 configured to perform various functions described herein. In some examples, the at least one processor 1740 may include multiple processors and the at least one memory 1730 may include multiple memories. One or more of the multiple processors may be coupled with one or more of the multiple memories, which may, individually or collectively, be configured to perform various functions described herein. In some examples, the at least one processor 1740 may be a component of a processing system, which may refer to a system (such as a series) of machines, circuitry (including, for example, one or both of processor circuitry (which may include the at least one processor 1740) and memory circuitry (which may include the at least one memory 1730)), or components, that receives or obtains inputs and processes the inputs to produce, generate, or obtain a set of outputs. The processing system may be configured to perform one or more of the functions described herein. For example, the at least one processor 1740 or a processing system including the at least one processor 1740 may be configured to, configurable to, or operable to cause the device 1705 to perform one or more of the functions described herein. Further, as described herein, being "configured to," being "configurable to," and being "operable to" may be used interchangeably and may be associated with a capability, when executing code 1735 (e.g., processor-executable code) stored in the at least one memory 1730 or otherwise, to perform one or more of the functions described herein.

The communications manager 1720 may support wireless communications in accordance with examples as disclosed herein. For example, the communications manager 1720 is capable of, configured to, or operable to support a means for receiving control signaling that indicates a configuration including a first set of one or more parameters for an ARQ procedure associated with an RLC entity of the device 1705, where at least one parameter of the first set of one or more parameters is associated with a set of multiple values. The communications manager 1720 is capable of, configured to, or operable to support a means for selecting a value of the set of multiple values for the ARQ procedure based on a second set of one or more parameters. The communications manager 1720 is capable of, configured to, or operable to support a means for receiving at least one NACK for at least one PDU of a set of one or more PDUs associated with the RLC entity of the device 1705. The communications manager 1720 is capable of, configured to, or operable to support a means for performing one or more operations based on the at least one NACK for the at least one PDU and the selected value of the set of multiple values for the ARQ procedure, wherein the one or more operations includes a drop of the at least one PDU, a retransmission of the at least one PDU, or a declaration of an RLF.

By including or configuring the communications manager 1720 in accordance with examples as described herein, the device 1705 may support techniques for reduced latency, reduced processing, reduced power consumption, and more efficient utilization of resources.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the at least one processor 1740, the at least one memory 1730, the code 1735, or any combination thereof. For example, the code 1735 may include instructions executable by the at least one processor 1740 to cause the device 1705 to perform various aspects of AI-enabled ARQ as described herein, or the at least one processor 1740 and the at least one memory 1730 may be otherwise configured to, individually or collectively, perform or support such operations.

Figure 18:
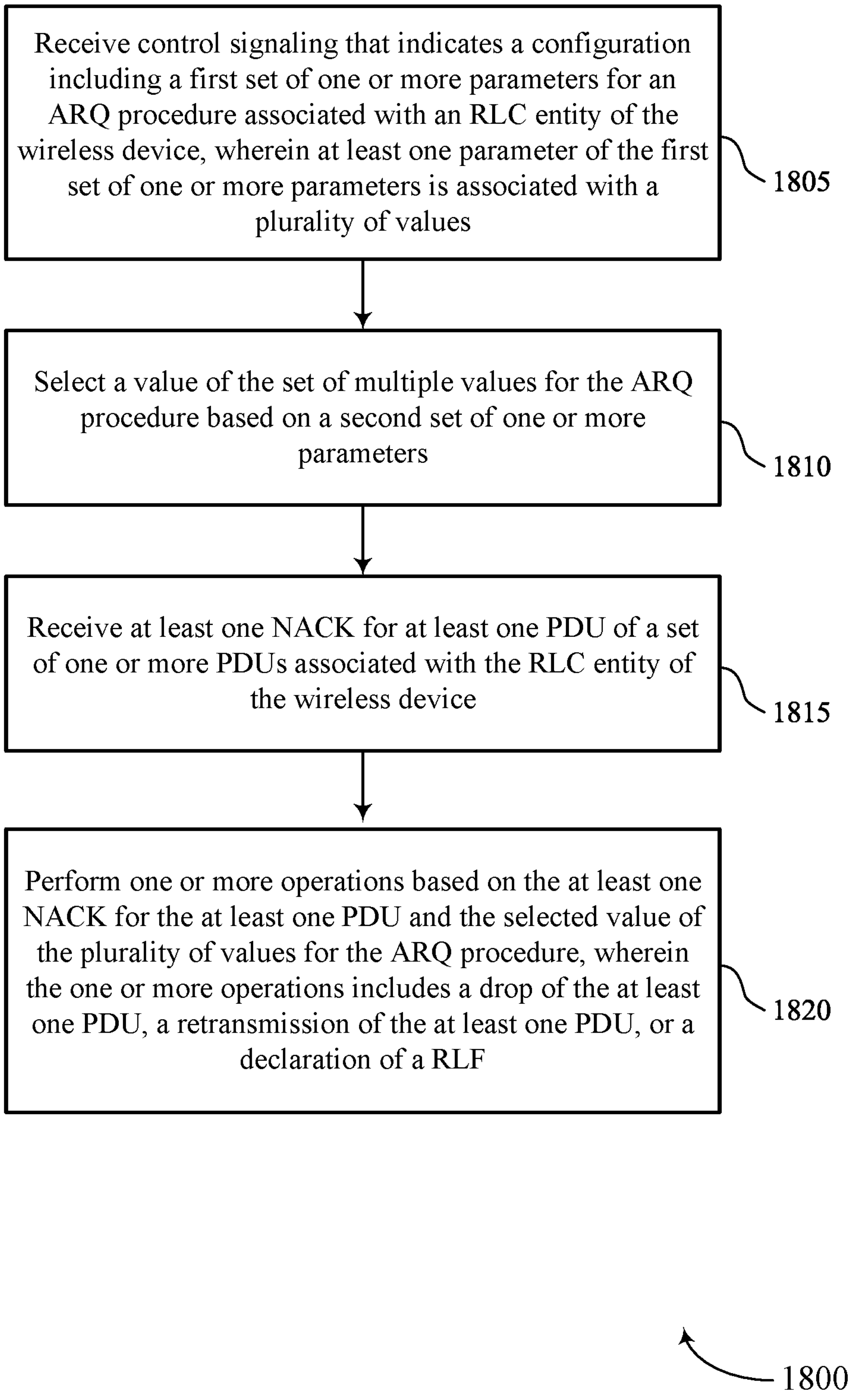
FIG. 18 shows a flowchart illustrating methods that support AI-enabled ARQ in accordance with one or more aspects of the present disclosure.

FIG. 18 shows a flowchart illustrating a method 1800 that supports AI-enabled ARQ in accordance with one or more aspects of the present disclosure. The operations of the method 1800 may be implemented by a wireless device or its components as described herein. For example, the operations of the method 1800 may be performed by a network entity 105, a base station 140, or a UE 115 as described with reference to FIGS. 1 through 17. In some examples, a network entity 105, a base station 140, or a UE 115 may execute a set of instructions to control the functional elements of the network entity 105, the base station 140, or the UE 115 to perform the described functions. Additionally, or alternatively, the network entity 105, the base station 140, or the UE 115 may perform aspects of the described functions using special-purpose hardware.

At 1805, the method may include receiving control signaling that indicates a configuration including a first set of one or more parameters for an ARQ procedure associated with an RLC entity of the wireless device, where at least one parameter of the first set of one or more parameters is associated with a set of multiple values. The operations of 1805 may be performed in accordance with examples as disclosed herein. In some examples, aspects of the operations of 1805 may be performed by a configuration component 1625 as described with reference to FIG. 16.

At 1810, the method may include selecting a value of the set of multiple values for the ARQ procedure based on a second set of one or more parameters. The operations of 1810 may be performed in accordance with examples as disclosed herein. In some examples, aspects of the operations of 1810 may be performed by a parameter component 1630 as described with reference to FIG. 16.

At 1815, the method may include receiving at least one NACK for at least one PDU of a set of one or more PDUs associated with the RLC entity of the wireless device. The operations of 1815 may be performed in accordance with examples as disclosed herein. In some examples, aspects of the operations of 1815 may be performed by a feedback component 1635 as described with reference to FIG. 16.

At 1820, the method may include performing one or more operations based on the at least one NACK for the at least one PDU and the selected value of the set of multiple values for the ARQ procedure, wherein the one or more operations includes a drop of the at least one PDU, a retransmission of the at least one PDU, or a declaration of a RLF. The operations of 1820 may be performed in accordance with examples as disclosed herein. In some examples, aspects of the operations of 1820 may be performed by a protocol component 1640 as described with reference to FIG. 16.

It should be noted that the methods described herein describe possible implementations. The operations and the steps may be rearranged or otherwise modified and other implementations are possible. Further, aspects from two or more of the methods may be combined.

The following provides an overview of aspects of the present disclosure:

Aspect 1: A method for wireless communications at a wireless device, comprising: receiving control signaling that indicates a configuration comprising a first set of one or more parameters for an ARQ procedure associated with an RLC entity of the wireless device, wherein at least one parameter of the first set of one or more parameters is associated with a plurality of values; selecting a value of the plurality of values for the ARQ procedure based at least in part on a second set of one or more parameters; receiving at least one NACK for at least one PDU of a set of one or more PDUs associated with the RLC entity of the wireless device; and performing one or more operations based at least in part on the at least one NACK for the at least one PDU and the selected value of the plurality of values for the ARQ procedure, wherein the one or more operations includes a drop of the at least one PDU, a retransmission of the at least one PDU, or a declaration of an RLF.

Aspect 2: The method of aspect 1, further comprising: transmitting, via the RLC entity of the wireless device, an indication to a second RLC entity of a second wireless device for updating a reception window associated with the set of one or more PDUs, wherein the one or more operations are performed further based at least in part on the indication.

Aspect 3: The method of aspect 2, further comprising: generating a control PDU comprising a set of one or more fields, wherein at least one field of the set of one or more fields comprises the indication, wherein updating the reception window corresponds to moving the reception window according to at least one sequence number; transmitting, to the second wireless device, the control PDU; and updating a sequence number associated with at least one second PDU based at least in part on the indication, wherein the sequence number corresponds to the at least one sequence number.

Aspect 4: The method of any of aspects 2 through 3, wherein the indication serves as a trigger to update a third set of one or more parameters associated with the second RLC entity of the second wireless device, the third set of one or more parameters comprises a sequence number parameter associated with the set of one or more PDUs, a reassembly parameter associated with the set of one or more PDUs, or a status parameter associated with the set of one or more PDUs.

Aspect 5: The method of any of aspects 1 through 4, wherein the first set of one or more parameters comprises an input to a learning model for the ARQ procedure, the second set of one or more parameters comprises an output of the learning model for the ARQ procedure, and wherein selecting the value of the plurality of values for the ARQ procedure is based at least in part on the input to the learning model and the output of the learning model.

Aspect 6: The method of aspect 5, further comprising: receiving, from a second wireless device, control signaling comprising a configuration that indicates a third set of one or more parameters, wherein the configuration comprises an RRC configuration, and wherein the third set of one or more parameters comprises at least one performance metric for the ARQ procedure; and applying the third set of one or more parameters to the learning model for ARQ procedure.

Aspect 7: The method of aspect 6, further comprising: obtaining the output from the learning model based at least in part on one or more of the first set of one or more parameters or the third set of one or more parameters and on a mapping of one or more of the first set of one or more parameters or the third set of one or more parameters to the second set of one or more parameters, wherein the output indicates at least one parameter of the second set of one or more parameters, wherein the at least one parameter corresponds to at least one of the one or more operations.

Aspect 8: The method of aspect 7, wherein the output from the learning model is based at least in part on a fourth set of one or more parameters, wherein the fourth set of one or more parameters is based at least in part on one or more of the first set of one or more parameters or the third set of one or more parameters, and wherein at least one parameter of the fourth set of one or more parameters indicates a first threshold quantity of retransmissions for the at least one PDU, wherein the first threshold quantity of retransmissions is to be satisfied before the at least one PDU is dropped, a transmission window associated with the set of one or more PDUs and for detection of an RLF, the transmission window corresponding to a set of one more sequence numbers associated with the set of one or more PDUs, a second threshold quantity of retransmissions or drops for the set of one or more PDUs, wherein the second threshold quantity of retransmissions or drops is to be satisfied during the transmission window before the RLF is declared, a third threshold quantity of retransmissions for the at least one PDU, wherein the third threshold quantity of retransmissions for the at least one protocol data unit is to be satisfied before the RLF is declared, an RSRP threshold value that serves as a trigger to enable one or more of the first threshold quantity of retransmissions or the third threshold quantity of retransmissions, or an activation or deactivation of the learning model.

Aspect 9: The method of aspect 8, further comprising: updating at least one parameter of the fourth set of one or more parameters based at least in part on a periodicity; and transmitting, to a second wireless device, an indication of the at least one parameter of the fourth set of one or more parameters.

Aspect 10: The method of any of aspects 7 through 9, wherein the mapping comprises an association between one or more of the first set of one or more parameters or the third set of one or more parameters to the second set of one or more parameters according to a data traffic flow associated with the at least one PDU, a logical channel associated with the at least one PDU, or a component carrier associated with the at least one PDU.

Aspect 11: The method of any of aspects 5 through 10, further comprising: generating a report associated with the learning model, wherein the report comprises a set of one or more logs associated with processing of one or more PDUs of the set of one or more PDUs according to the learning model; and transmitting, to a second wireless device, the report associated with the learning model.

Aspect 12: The method of aspect 11, wherein at least one log of the set of one or more logs indicates a fourth set of one or more parameters corresponding to an output of the learning model, the fourth set of one or more parameters comprising one or more of a first threshold quantity of retransmissions for the at least one PDU, wherein the first threshold quantity of retransmissions is to be satisfied before the at least one PDU is dropped, a transmission window associated with the set of one or more PDUs and for detection of an RLF, the transmission window corresponding to a set of one more sequence numbers associated with the set of one or more PDUs, a second threshold quantity of retransmissions or drops for the set of one or more PDUs, wherein the second threshold quantity of retransmissions or drops is to be satisfied during the transmission window before the RLF is declared, a third threshold quantity of retransmissions for the at least one PDU, wherein the third threshold quantity of retransmissions for the at least one protocol data unit is to be satisfied before the RLF is declared, or an RSRP threshold value that serves as a trigger to enable one or more of the first threshold quantity of retransmissions or the third threshold quantity of retransmissions.

Aspect 13: The method of any of aspects 11 through 12, wherein at least one log of the set of one or more logs indicates one or more of a quantity of retransmissions associated with the set of one or more PDUs, a quantity of drops associated with the set of one or more PDUs, or a quantity of RLFs associated with the set of one or more PDUs.

Aspect 14: The method of any of aspects 11 through 13, wherein at least one log of the set of one or more logs comprises an indication that the RLC entity of the wireless device satisfies at least one parameter of a third set of one or more parameters for a packet delay budget, the at least one parameter comprises a threshold quantity of successful transmissions of the set of one or more PDUs, and the indication comprises a percentage corresponding to successful transmissions of the set of one or more PDUs within the packet delay budget.

Aspect 15: The method of any of aspects 11 through 14, further comprising: determining a performance metric associated with the learning model based at least in part on processing the set of one or more PDUs according to the learning model, wherein the performance metric may indicate a difference between an expected quantity of PDU transmissions of the set of one or more PDUs and an actual quantity of PDU transmissions of the set of one or more PDUs.

Aspect 16: The method of any of aspects 5 through 15, further comprising: transmitting, to a second wireless device, a report comprising capability information that indicates whether the wireless device supports the learning model, the capability information comprising one or more of at least one bit field, and wherein the capability information is based at least in part on a performance metric associated with the learning model, wherein the control signaling that indicates the configuration is received based at least in part on the capability information that indicates whether the wireless device supports the learning model.

Aspect 17: The method of any of aspects 5 through 16, further comprising: determining at least two states associated with the RLC entity of the wireless device, wherein: a first state of the at least two states corresponds to a set of one or more conditions associated with processing the set of one or more PDUs irrespective of the learning model, a second state of the at least two states corresponds to processing the set of one or more PDUs according to the learning model, the configuration comprises an indication of the set of one or more conditions associated with processing the set of one or more PDUs irrespective of the learning model, and the set of one or more conditions comprises a first condition to be satisfied before the RLF is declared, a second condition to be satisfied before the retransmission of the at least one PDU, or a third condition to be satisfied before the at least one PDU is dropped.

Aspect 18: The method of any of aspects 1 through 17, wherein receiving at least one NACK for the at least one PDU comprises: obtaining, via the RLC entity of the wireless device, a status report comprising the at least one NACK for the at least one PDU, wherein the at least one PDU comprises a header that indicates a sequence number associated with the at least one PDU, and wherein the status report is based at least in part on the sequence number associated with the at least one PDU, wherein the first set of one or more parameters comprises one or more of at least one radio link condition, at least one HARQ process, at least one status of the RLC entity of the wireless device, at least one status of a PDCP entity of the wireless device, at least one quality level of at least one parameter of a third set of one or more parameters satisfying a threshold, at least one status of a TCP, or at least on criterion of an application or service associated with the wireless device.

Aspect 19: A wireless device for wireless communications, comprising one or more memories storing processor-executable code, and one or more processors coupled with the one or more memories and individually or collectively operable to execute the code to cause the wireless device to perform a method of any of aspects 1 through 18.

Aspect 20: A wireless device for wireless communications, comprising at least one means for performing a method of any of aspects 1 through 18.

Aspect 21: A non-transitory computer-readable medium storing code for wireless communications, the code comprising instructions executable by one or more processors to perform a method of any of aspects 1 through 18.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:

one or more memories storing processor-executable code; and one or more processors coupled with the one or more memories and individually or collectively operable to execute the code to cause the wireless device to:

receive control signaling that indicates a configuration comprising a first set of one or more parameters for an automatic repeat request procedure associated with a radio link control entity of the wireless device, wherein at least one parameter of the first set of one or more parameters is associated with a plurality of values, and wherein the first set of one or more parameters comprises an input to a learning model for the automatic repeat request procedure;

select a value of the plurality of values for the automatic repeat request procedure based at least in part on a second set of one or more parameters, wherein the second set of one or more parameters comprises an output of the learning model for the automatic repeat request procedure, and wherein the selected value of the plurality of values for the automatic repeat request procedure is based at least in part on the input to the learning model and the output of the learning model;

receive at least one negative acknowledgment for at least one protocol data unit of a set of one or more protocol data units associated with the radio link control entity of the wireless device; and perform one or more operations based at least in part on the at least one negative acknowledgment and the selected value of the plurality of values for the automatic repeat request procedure, wherein the one or more operations includes a drop of the at least one protocol data unit, a retransmission of the at least one protocol data unit, or a declaration of a radio link failure.

2. The wireless device of claim 1, wherein the one or more processors are individually or collectively further operable to execute the code to cause the wireless device to:

transmit, via the radio link control entity of the wireless device, an indication to a second radio link control entity of a second wireless device for updating a reception window associated with the set of one or more protocol data units, wherein the one or more operations are performed further based at least in part on the indication.

3. The wireless device of claim 2, wherein the one or more processors are individually or collectively further operable to execute the code to cause the wireless device to:

generate a control protocol data unit comprising a set of one or more fields, wherein at least one field of the set of one or more fields comprises the indication, wherein updating the reception window corresponds to moving the reception window according to at least one sequence number;

transmit, to the second wireless device, the control protocol data unit; and update a sequence number associated with at least one second protocol data unit based at least in part on the indication, wherein the sequence number corresponds to the at least one sequence number.

4. The wireless device of claim 2, wherein the indication serves as a trigger to update a third set of one or more parameters associated with the second radio link control entity of the second wireless device, and wherein the third set of one or more parameters comprises a sequence number parameter associated with the set of one or more protocol data units, a reassembly parameter associated with the set of one or more protocol data units, or a status parameter associated with the set of one or more protocol data units.

5. The wireless device of claim 1, wherein the one or more processors are individually or collectively further operable to execute the code to cause the wireless device to:

receive, from a second wireless device, control signaling comprising a configuration that indicates a third set of one or more parameters, wherein the configuration comprises a radio resource control configuration, and wherein the third set of one or more parameters comprises at least one performance metric for the automatic repeat request procedure; and apply the third set of one or more parameters to the learning model for automatic repeat request procedure.

6. The wireless device of claim 5, wherein the one or more processors are individually or collectively further operable to execute the code to cause the wireless device to:

obtain the output from the learning model based at least in part on one or more of the first set of one or more parameters or the third set of one or more parameters and on a mapping of one or more of the first set of one or more parameters or the third set of one or more parameters to the second set of one or more parameters, wherein the output indicates at least one parameter of the second set of one or more parameters, wherein the at least one parameter corresponds to at least one of the one or more operations.

7. The wireless device of claim 6, wherein the output from the learning model is based at least in part on a fourth set of one or more parameters, wherein the fourth set of one or more parameters is based at least in part on one or more of the first set of one or more parameters or the third set of one or more parameters, and wherein at least one parameter of the fourth set of one or more parameters indicates:

a first threshold quantity of retransmissions for the at least one protocol data unit, wherein the first threshold quantity of retransmissions is to be satisfied before the at least one protocol data unit is dropped, a transmission window associated with the set of one or more protocol data units and for detection of a radio link failure, the transmission window corresponding to a set of one or more sequence numbers associated with the set of one or more protocol data units, a second threshold quantity of retransmissions or drops for the set of one or more protocol data units, wherein the second threshold quantity of retransmissions or drops is to be satisfied during the transmission window before the radio link failure is declared, a third threshold quantity of retransmissions for the at least one protocol data unit, wherein the third threshold quantity of retransmissions for the at least one protocol data unit is to be satisfied before the radio link failure is declared, a reference signal received power threshold value that serves as a trigger to enable one or more of the first threshold quantity of retransmissions or the third threshold quantity of retransmissions, or an activation or deactivation of the learning model.

8. The wireless device of claim 7, wherein the one or more processors are individually or collectively further operable to execute the code to cause the wireless device to:

update at least one parameter of the fourth set of one or more parameters based at least in part on a periodicity; and transmit, to a second wireless device, an indication of the at least one parameter of the fourth set of one or more parameters.

9. The wireless device of claim 6, wherein the mapping comprises an association between one or more of the first set of one or more parameters or the third set of one or more parameters to the second set of one or more parameters according to a data traffic flow associated with the at least one protocol data unit, a logical channel associated with the at least one protocol data unit, or a component carrier associated with the at least one protocol data unit.

10. The wireless device of claim 1, wherein the one or more processors are individually or collectively further operable to execute the code to cause the wireless device to:

generate a report associated with the learning model, wherein the report comprises a set of one or more logs associated with processing of one or more protocol data units of the set of one or more protocol data units according to the learning model; and transmit, to a second wireless device, the report associated with the learning model.

11. The wireless device of claim 10, wherein at least one log of the set of one or more logs indicates a fourth set of one or more parameters corresponding to the output of the learning model, the fourth set of one or more parameters comprising one or more of:

a first threshold quantity of retransmissions for the at least one protocol data unit, wherein the first threshold quantity of retransmissions is to be satisfied before the at least one protocol data unit is dropped, a transmission window associated with the set of one or more protocol data units and for detection of a radio link failure, the transmission window corresponding to a set of one or more sequence numbers associated with the set of one or more protocol data units, a second threshold quantity of retransmissions or drops for the set of one or more protocol data units, wherein the second threshold quantity of retransmissions or drops is to be met or exceeded during the transmission window before the radio link failure is declared, a third threshold quantity of retransmissions for the at least one protocol data unit, wherein the third threshold quantity of retransmissions for the at least one protocol data unit is to be satisfied before the radio link failure is declared, or a reference signal received power threshold value that serves as a trigger to enable one or more of the first threshold quantity of retransmissions or the third threshold quantity of retransmissions.

12. The wireless device of claim 10, wherein at least one log of the set of one or more logs indicates one or more of a quantity of retransmissions associated with the set of one or more protocol data units, a quantity of drops associated with the set of one or more protocol data units, or a quantity of radio link failures associated with the set of one or more protocol data units.

13. The wireless device of claim 10, wherein at least one log of the set of one or more logs comprises an indication that the radio link control entity of the wireless device satisfies at least one parameter of a third set of one or more parameters for a packet delay budget, wherein the at least one parameter comprises a threshold quantity of successful transmissions of the set of one or more protocol data units, and wherein the indication comprises a percentage corresponding to successful transmissions of the set of one or more protocol data units within the packet delay budget.

14. The wireless device of claim 10, wherein the one or more processors are individually or collectively further operable to execute the code to cause the wireless device to:

determine a performance metric associated with the learning model based at least in part on processing the set of one or more protocol data units according to the learning model, wherein the performance metric indicates a difference between an expected quantity of protocol data unit transmissions of the set of one or more protocol data units and an actual quantity of protocol data unit transmissions of the set of one or more protocol data units.

15. The wireless device of claim 1, wherein the one or more processors are individually or collectively further operable to execute the code to cause the wireless device to:

transmit, to a second wireless device, a report comprising capability information that indicates whether the wireless device supports the learning model, the capability information comprising one or more of at least one bit field, and wherein the capability information is based at least in part on a performance metric associated with the learning model, wherein the control signaling is received based at least in part on the capability information that indicates whether the wireless device supports the learning model.

16. The wireless device of claim 1, wherein the one or more processors are individually or collectively further operable to execute the code to cause the wireless device to:

determine at least two states associated with the radio link control entity of the wireless device, wherein:

a first state of the at least two states corresponds to a set of one or more conditions associated with processing the set of one or more protocol data units irrespective of the learning model, a second state of the at least two states corresponds to processing the set of one or more protocol data units according to the learning model, wherein the configuration comprises an indication of the set of one or more conditions associated with processing the set of one or more protocol data units irrespective of the learning model, and the set of one or more conditions comprises a first condition to be satisfied before the radio link failure is declared, a second condition to be satisfied before the retransmission of the at least one protocol data unit, or a third condition to be satisfied before the at least one protocol data unit is dropped.

17. The wireless device of claim 1, wherein, to receive the at least one negative acknowledgment for the at least one protocol data unit, the one or more processors are individually or collectively operable to execute the code to cause the wireless device to:

obtain, via the radio link control entity of the wireless device, a status report comprising the at least one negative acknowledgment for the at least one protocol data unit, wherein the at least one protocol data unit comprises a header that indicates a sequence number associated with the at least one protocol data unit, and wherein the status report is based at least in part on the sequence number associated with the at least one protocol data unit, wherein the first set of one or more parameters comprise one or more of at least one radio link condition, at least one hybrid automatic repeat request (HARQ) process, at least one status of the radio link control entity of the wireless device, at least one status of a packet data convergence protocol entity of the wireless device, at least one quality level of at least one parameter of a third set of one or more parameters satisfying a threshold, at least one status of a transmission control protocol (TCP), or at least on criterion of an application or service associated with the wireless device.

18. A method for wireless communications at a wireless device, comprising:

receiving control signaling that indicates a configuration comprising a first set of one or more parameters for an automatic repeat request procedure associated with a radio link control entity of the wireless device, wherein at least one parameter of the first set of one or more parameters is associated with a plurality of values, and wherein the first set of one or more parameters comprises an input to a learning model for the automatic repeat request procedure;

selecting a value of the plurality of values for the automatic repeat request procedure based at least in part on a second set of one or more parameters, wherein the second set of one or more parameters comprises an output of the learning model for the automatic repeat request procedure, and wherein the selected value of the plurality of values for the automatic repeat request procedure is based at least in part on the input to the learning model and the output of the learning model;

receiving at least one negative acknowledgment for at least one protocol data unit of a set of one or more protocol data units associated with the radio link control entity of the wireless device; and performing one or more operations based at least in part on the at least one negative acknowledgment for the at least one protocol data unit and the selected value of the plurality of values for the automatic repeat request procedure, wherein the one or more operations includes a drop of the at least one protocol data unit, a retransmission of the at least one protocol data unit, or a declaration of a radio link failure.

19. A wireless device for wireless communications, comprising:

means for receiving control signaling that indicates a configuration comprising a first set of one or more parameters for an automatic repeat request procedure associated with a radio link control entity of the wireless device, wherein at least one parameter of the first set of one or more parameters is associated with a plurality of values, and wherein the first set of one or more parameters comprises an input to a learning model for the automatic repeat request procedure;

means for selecting a value of the plurality of values for the automatic repeat request procedure based at least in part on a second set of one or more parameters, wherein the second set of one or more parameters comprises an output of the learning model for the automatic repeat request procedure, and wherein the selected value of the plurality of values for the automatic repeat request procedure is based at least in part on the input to the learning model and the output of the learning model;

means for receiving at least one negative acknowledgment for at least one protocol data unit of a set of one or more protocol data units associated with the radio link control entity of the wireless device; and means for performing one or more operations based at least in part on the at least one negative acknowledgment for the at least one protocol data unit and the selected value of the plurality of values for the automatic repeat request procedure, wherein the one or more operations includes a drop of the at least one protocol data unit, a retransmission of the at least one protocol data unit, or a declaration of a radio link failure.

* * * * *